(12) United States Patent
Mathew et al.

(10) Patent No.: US 9,473,296 B2
(45) Date of Patent: Oct. 18, 2016

(54) INSTRUCTION AND LOGIC FOR A SIMON BLOCK CIPHER

(71) Applicants: Sanu K. Mathew, Hillsboro, OR (US); Himanshu Kaul, Portland, OR (US); Mark A. Anders, Hillsboro, OR (US)

(72) Inventors: Sanu K. Mathew, Hillsboro, OR (US); Himanshu Kaul, Portland, OR (US); Mark A. Anders, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 265 days.

(21) Appl. No.: 14/227,718

(22) Filed: Mar. 27, 2014

(65) Prior Publication Data

US 2015/0280909 A1    Oct. 1, 2015

(51) Int. Cl.
*H04L 9/06* (2006.01)
*G06F 21/62* (2013.01)
*G09C 1/00* (2006.01)

(52) U.S. Cl.
CPC ............. *H04L 9/0618* (2013.01); *G06F 21/62* (2013.01); *G09C 1/00* (2013.01); *H04L 2209/24* (2013.01)

(58) Field of Classification Search
CPC ..... H04L 9/0819; H04L 9/14; H04L 9/0618; H04L 9/0625; H04L 2209/24; G06F 21/62; G09C 1/00
See application file for complete search history.

(56) References Cited

U.S. PATENT DOCUMENTS 7,240,084 B2 * 7/2007 Gura et al. ............... 708/492
8,392,168 B2 * 3/2013 Samper et al. .............. 703/22
2011/0138192 A1 * 6/2011 Kocher et al. ............. 713/189
2011/0231673 A1 * 9/2011 Alekseev et al. ........... 713/190
2011/0243324 A1 * 10/2011 Lima et al. ................. 380/212
2013/0108039 A1 * 5/2013 Gong et al. .................. 380/28
2014/0123147 A1 * 5/2014 Pantaleoni ................. 718/102
2014/0380037 A1 * 12/2014 Matsuda et al. ........... 713/150
2015/0010146 A1 * 1/2015 Matsuda et al. ............. 380/44
2015/0039904 A1 * 2/2015 Matsuda et al. ........... 713/189
2015/0074159 A1 * 3/2015 Poschmann et al. ....... 708/270

OTHER PUBLICATIONS

Smith et al., "The Simon and Speck Families of Lightweight Block Ciphers", Jun. 19, 2013, National Security Agency, p. 1-45.*
Beaulieu et al., "The Simon and Speck Block Ciphers on AVR 8-bit Microcontrollers", 2014, National Security Agency, p. 1-18.*
Beaulieu et al., "The Simon and Speck Block Ciphers for the Internet of Things", Jul. 9, 2015, National Security Agency, p. 1-15.*

* cited by examiner

*Primary Examiner* — Michael Pyzocha
*Assistant Examiner* — Nelson Giddins
(74) *Attorney, Agent, or Firm* — Baker Botts L.L.P.

(57) ABSTRACT

A processor includes an input-circuit and a Simon block cipher. The Simon block cipher includes a data transformation circuit, a constant generator, and a key expansion circuit. The data transformation circuit includes logic to shift content of data storage registers. The key expansion circuit includes logic to determine a round key based upon an input symmetric key and data input, a previous round key, and a value from the constant generator. The constant generator includes logic to output a successive one of a list of constants each clock cycle, and to store the outputted constants in storage units. The number of storage units is less than the size of the list of constants.

17 Claims, 25 Drawing Sheets

BITSLICE MODULE (BS)

$S^n i$ n-bit left rotate

KEY BITSLICE MODULE (KBS)

$Z_i = 1111101000100101011000011100110$ $Z_\lambda = 111110100100101011000011100110$

INSTRUCTION AND LOGIC FOR A SIMON BLOCK CIPHER

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. Applications of multiprocessor systems include dynamic domain partitioning all the way down to desktop computing. In order to take advantage of multiprocessor systems, code to be executed may be separated into multiple threads for execution by various processing entities. Each thread may be executed in parallel with one another.

Choosing cryptographic routines may including choosing trade-offs between security and resources necessary to implement the routine. While some cryptographic routines are not as secure as others, the resources necessary to implement them may be small enough to enable their use in a variety of applications where computing resources, such as processing power and memory, are less available than, for example, a desktop computer or larger computing scheme. The cost of implementing routines such as cryptographic routines may be measured in gate counts or gate-equivalent counts, throughput, power consumption, or production cost. Several cryptographic routines for use in computing applications include those known as AES, Hight, Iceberg, Katan, Klein, Led, mCrypton, Piccolo, Present, Prince, Twine, and EPCBC, though these routines are not necessarily compatible with each other, nor may one routine necessarily substitute for another.

DESCRIPTION OF THE FIGURES

Embodiments are illustrated by way of example and not limitation in the Figures of the accompanying drawings.

DETAILED DESCRIPTION

Figure 1A:
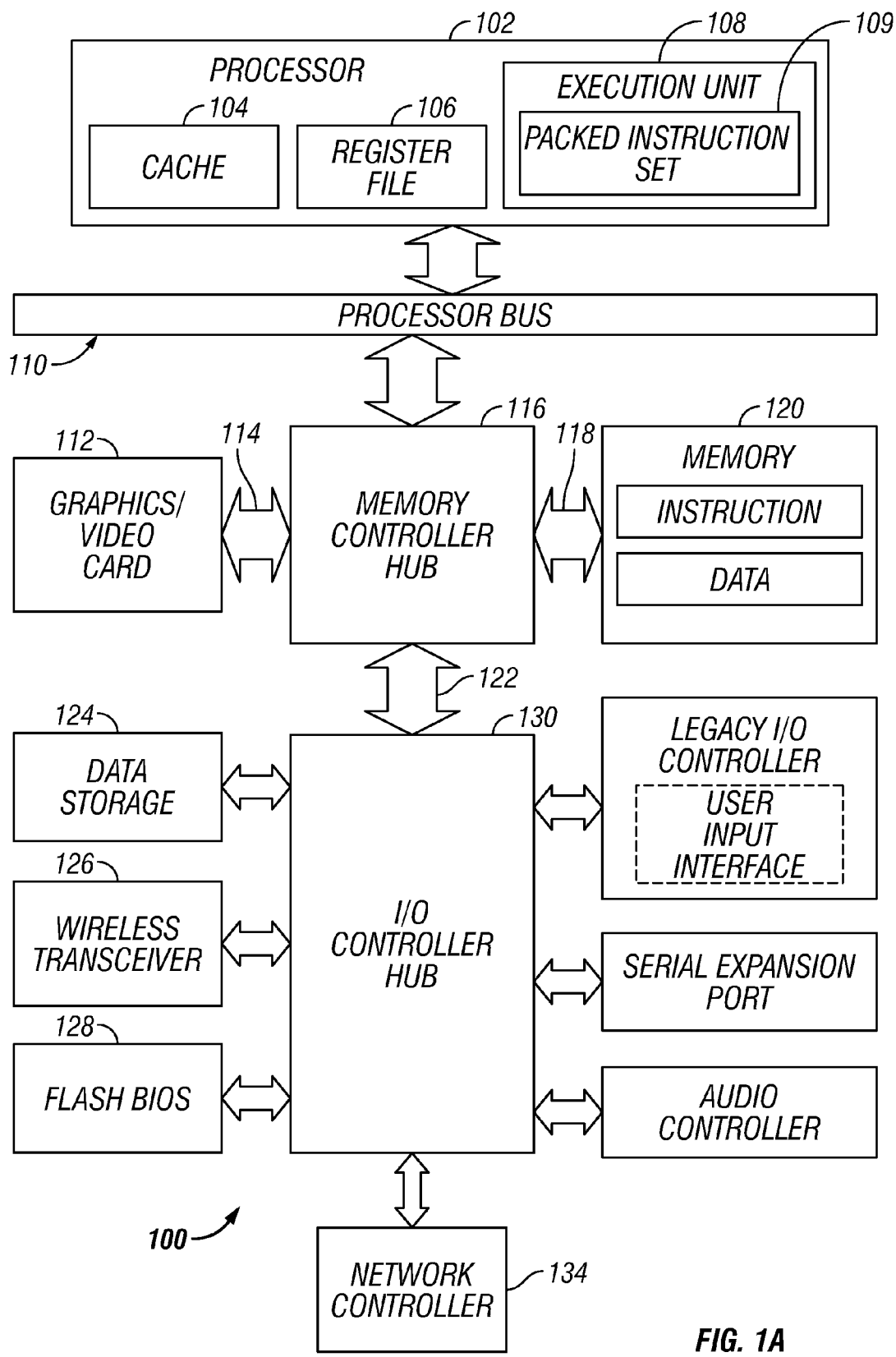
FIG. 1A is a block diagram of an exemplary computer system formed with a processor that may include execution units to execute an instruction, in accordance with embodiments of the present disclosure.

The following description describes an instruction and processing logic for a Simon block cipher within or in association with a processor, virtual processor, package, computer system, or other processing apparatus. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, steps of embodiments of the present disclosure might be performed by specific hardware components that contain fixed-function logic for performing the steps, or by any combination of programmed computer components and fixed-function hardware components.

Instructions used to program logic to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Discs, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a Dynamic Random Access Memory (DRAM) device, a Static Random Access Memory (SRAM) device, flash memory device, or other memory device. Memory 120 may store instructions and/or data represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for instruction and data storage and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
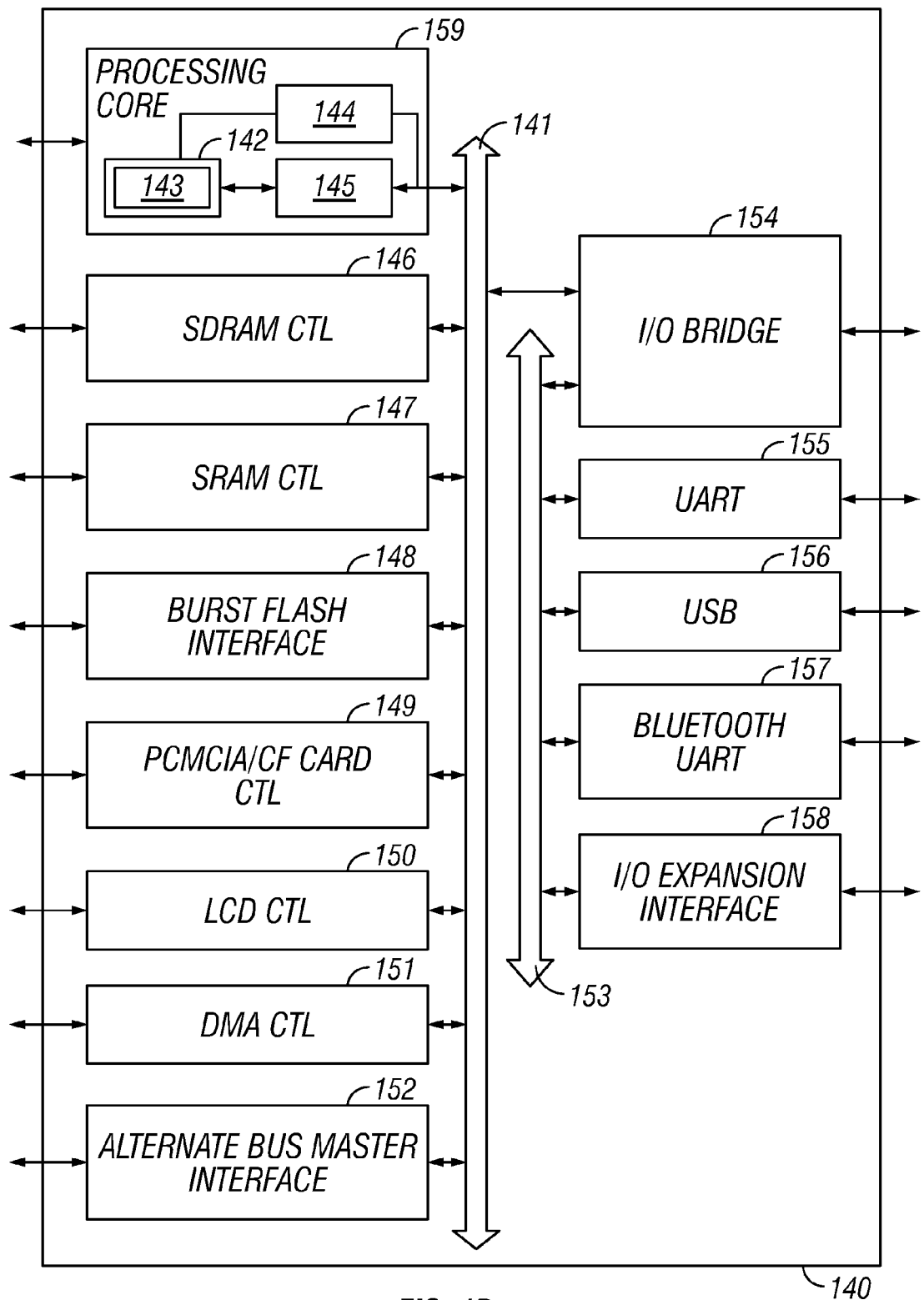
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW-type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, Synchronous Dynamic Random Access Memory (SDRAM) control 146, Static Random Access Memory (SRAM) control 147, burst flash memory interface 148, Personal Computer Memory Card International Association (PCMCIA)/Compact Flash (CF) card control 149, Liquid Crystal Display (LCD) control 150, Direct Memory Access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, Universal Asynchronous Receiver/Transmitter (UART) 155, Universal Serial Bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
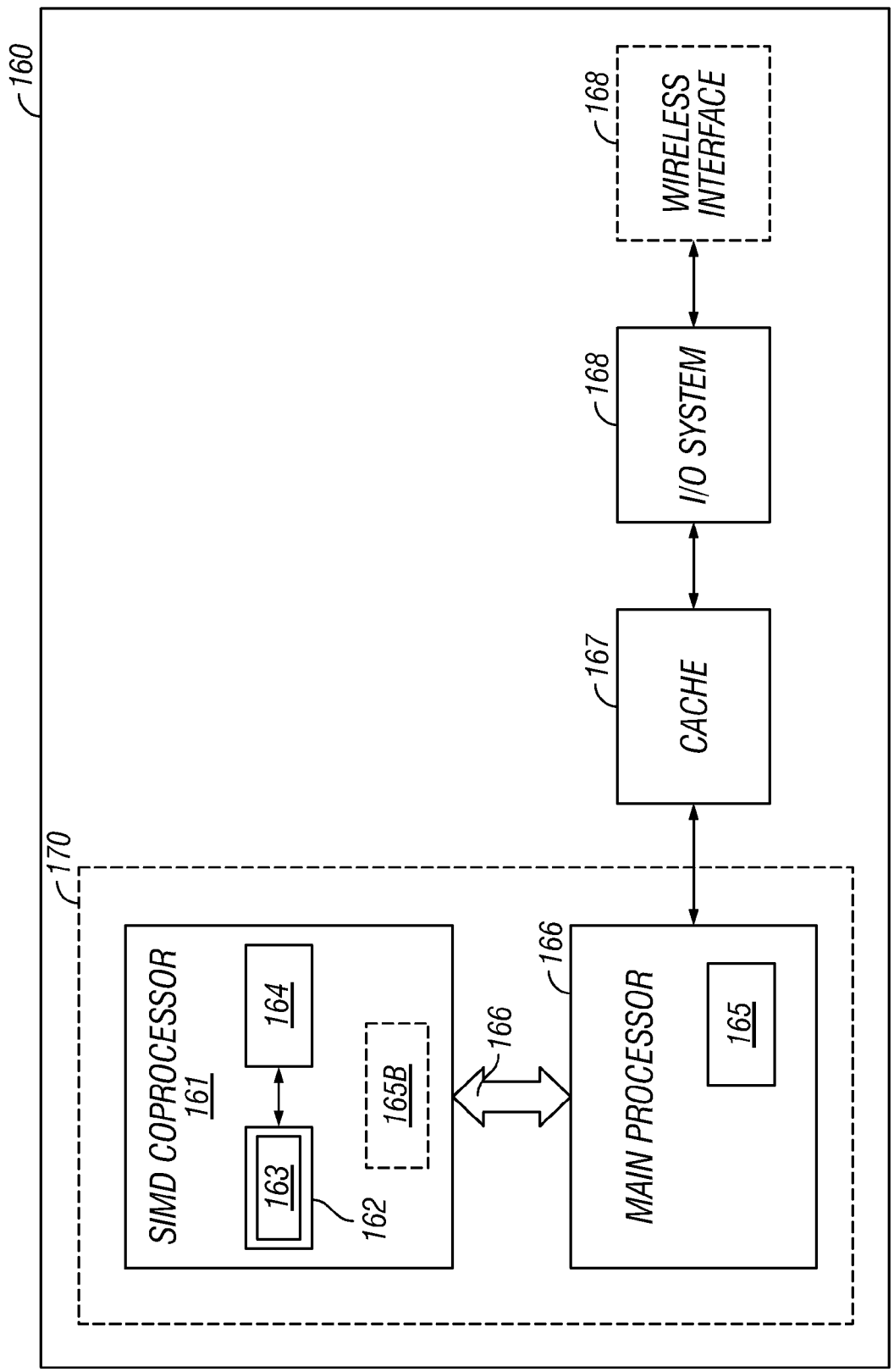
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 165 comprises a decoder 165 to recognize instructions of instruction set 163 including instructions in accordance with one embodiment for execution by execution unit 162. In other embodiments, SIMD coprocessor 161 also comprises at least part of decoder 165 to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 166. From coprocessor bus 166, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
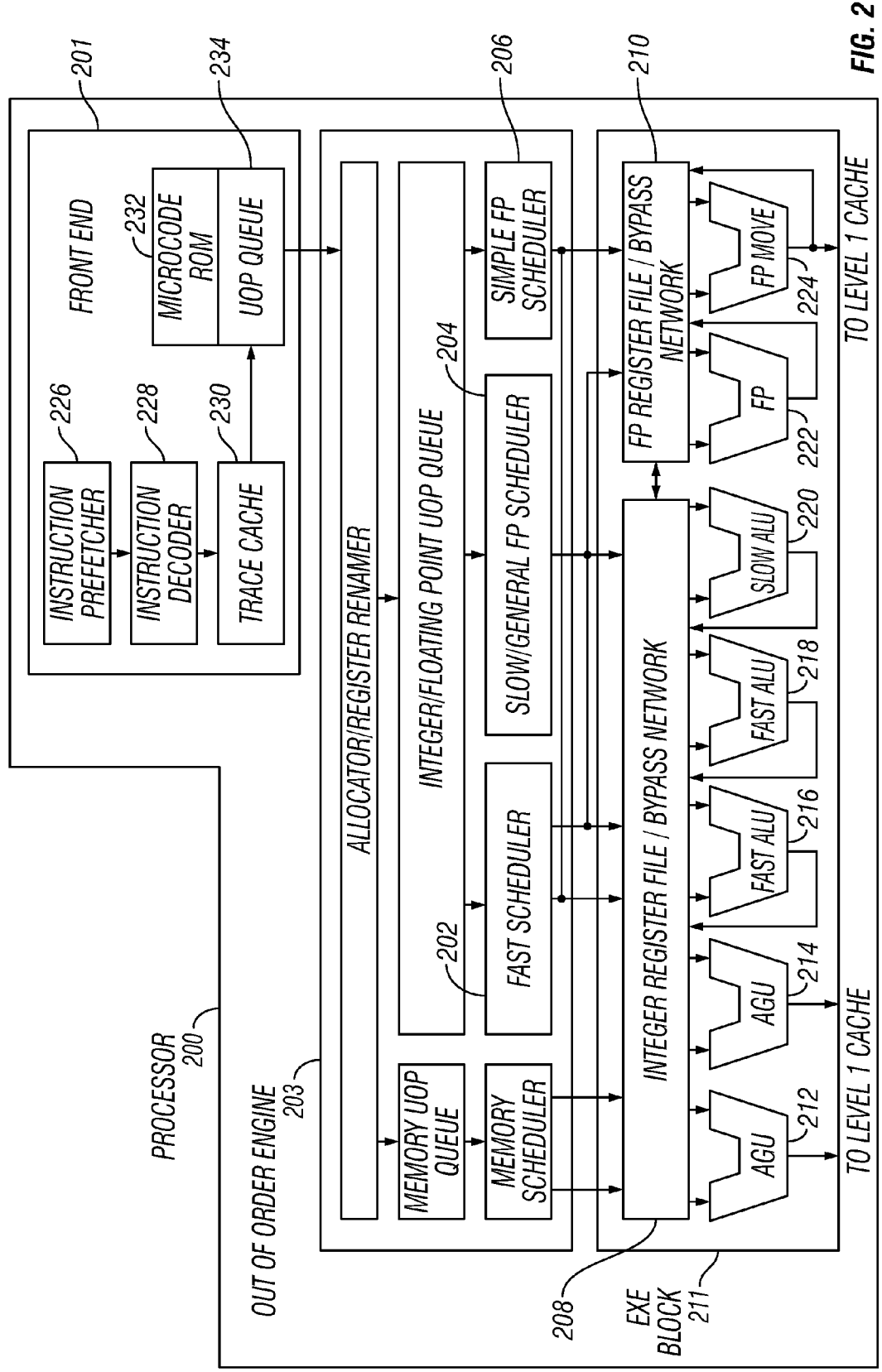
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single micro-op, whereas others need several micro-ops to complete the full operation. In one embodiment, if more than four micro-ops are needed to complete an instruction, decoder 228 may access microcode ROM 232 to perform the instruction. In one embodiment, an instruction may be decoded into a small number of micro-ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast Arithmetic Logic Unit (ALU) 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MMX™ registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point may be contained in the same register file or different register files. Furthermore, in one embodiment, floating point and integer data may be stored in different registers or the same registers.

Figure 3A:
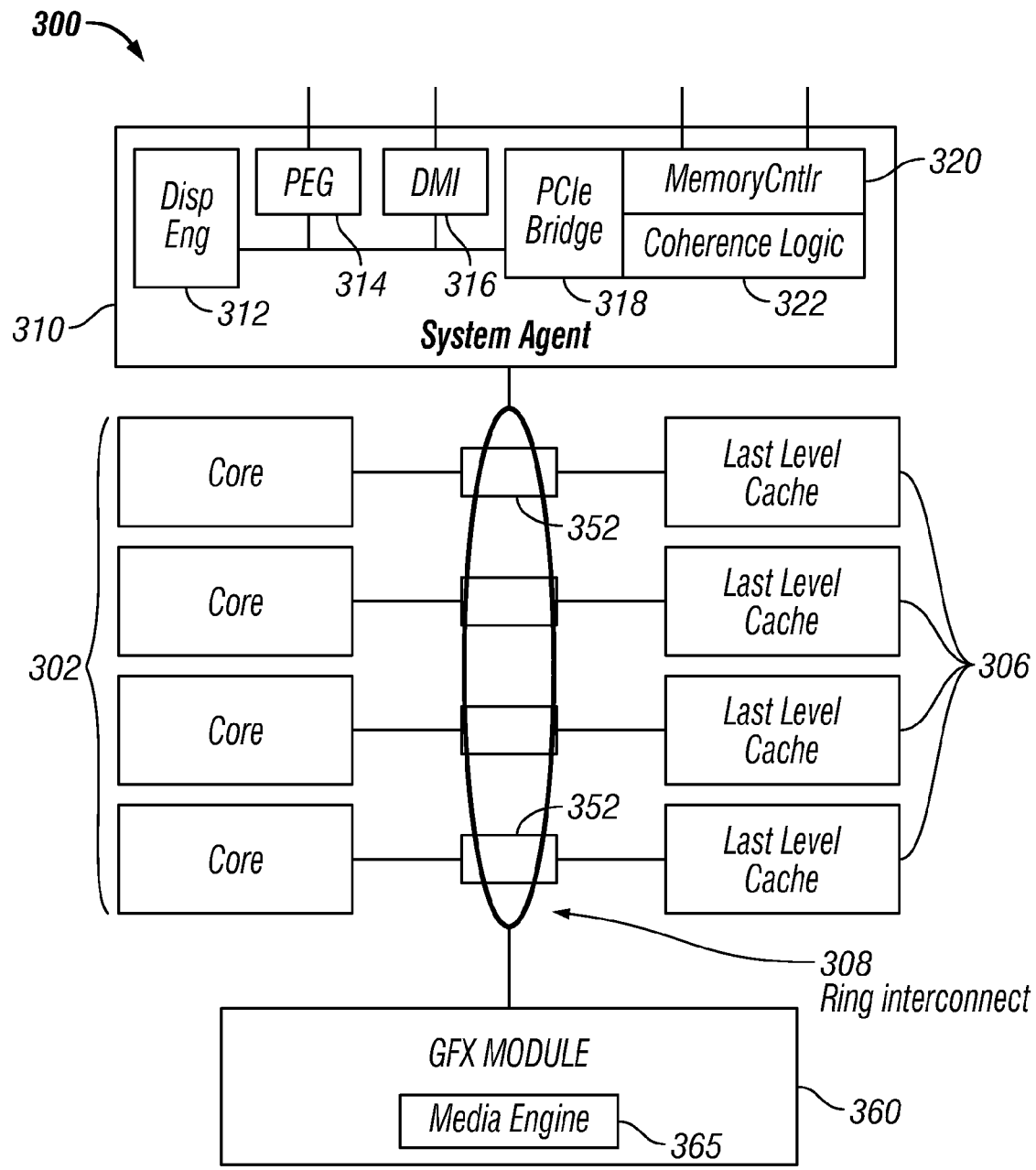
FIG. 3A is a block diagram of a processor, in accordance with embodiments of the present disclosure.
Figure 3B:
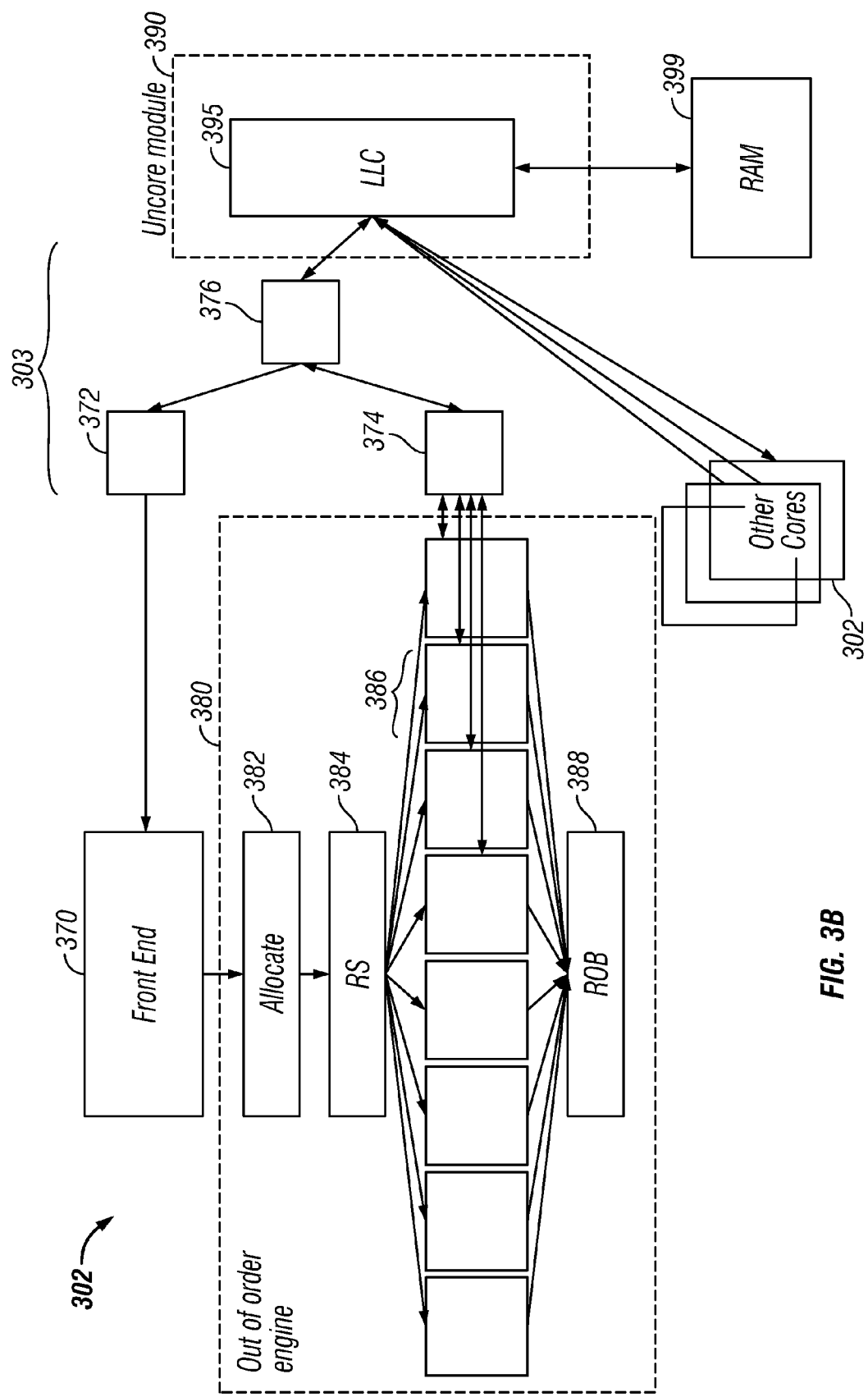
FIG. 3B is a block diagram of an example implementation of a core, in accordance with embodiments of the present disclosure.
Figure 4:
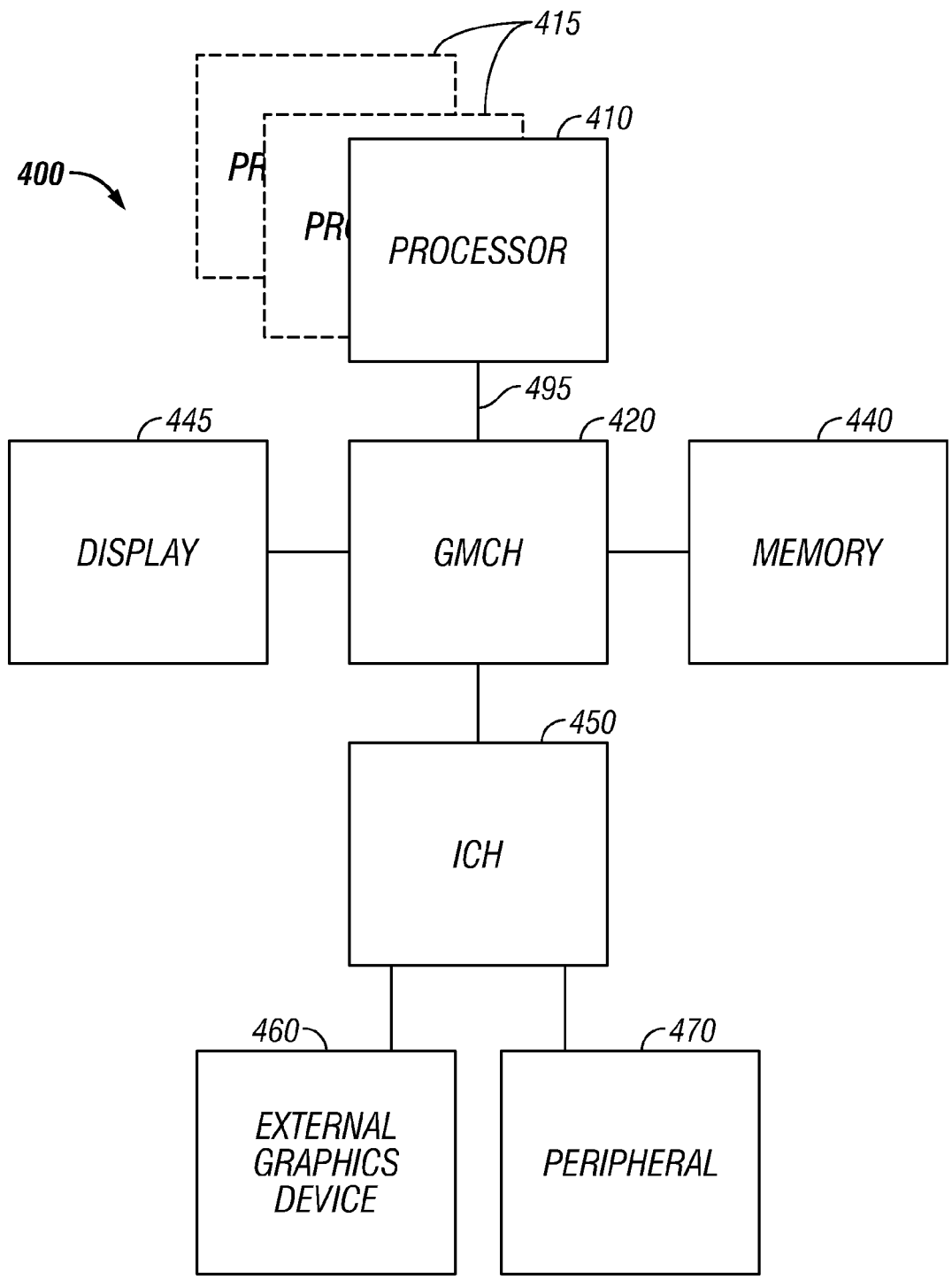
FIG. 4 is a block diagram of a system, in accordance with embodiments of the present disclosure.
Figure 5:
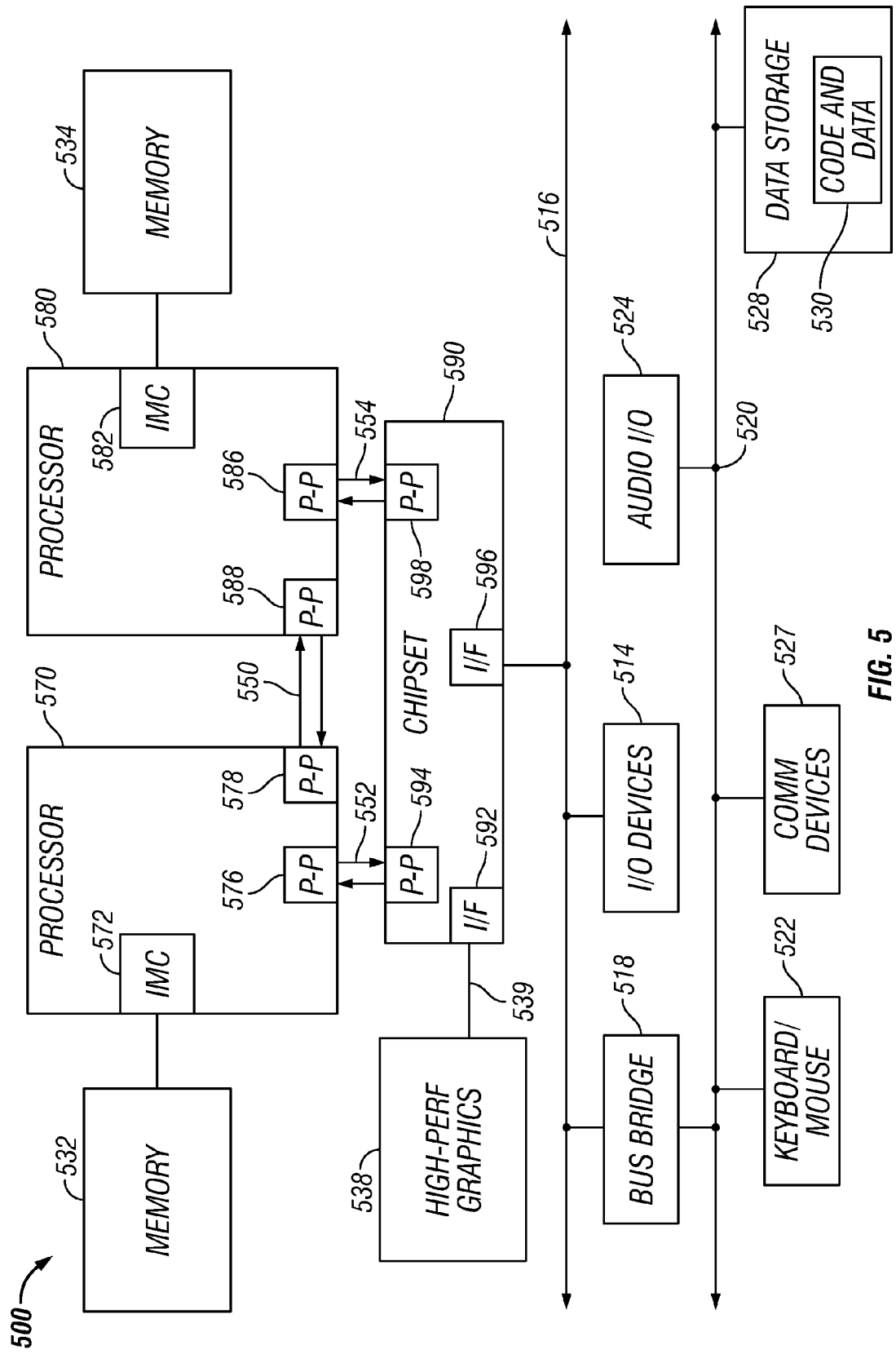
FIG. 5 is a block diagram of a second system, in accordance with embodiments of the present disclosure.

FIGS. 3-5 may illustrate exemplary systems suitable for including processor 300, while FIG. 4 may illustrate an exemplary System on a Chip (SoC) that may include one or more of cores 302. Other system designs and implementations known in the arts for laptops, desktops, handheld PCs, personal digital assistants, engineering workstations, servers, network devices, network hubs, switches, embedded processors, DSPs, graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 4 illustrates a block diagram of a system 400, in accordance with embodiments of the present disclosure. System 400 may include one or more processors 410, 415, which may be coupled to Graphics Memory Controller Hub (GMCH) 420. The optional nature of additional processors 415 is denoted in FIG. 4 with broken lines.

Each processor 410, 415 may be some version of processor 300. However, it should be noted that integrated graphics logic and integrated memory control units might not exist in processors 410, 415. FIG. 4 illustrates that GMCH 420 may be coupled to a memory 440 that may be, for example, a dynamic random access memory (DRAM). The DRAM may, for at least one embodiment, be associated with a non-volatile cache.

GMCH 420 may be a chipset, or a portion of a chipset. GMCH 420 may communicate with processors 410, 415 and control interaction between processors 410, 415 and memory 440. GMCH 420 may also act as an accelerated bus interface between the processors 410, 415 and other elements of system 400. In one embodiment, GMCH 420 communicates with processors 410, 415 via a multi-drop bus, such as a frontside bus (FSB) 495.

Furthermore, GMCH 420 may be coupled to a display 445 (such as a flat panel display). In one embodiment, GMCH 420 may include an integrated graphics accelerator. GMCH 420 may be further coupled to an input/output (I/O) controller hub (ICH) 450, which may be used to couple various peripheral devices to system 400. External graphics device 460 may include be a discrete graphics device coupled to ICH 450 along with another peripheral device 470.

In other embodiments, additional or different processors may also be present in system 400. For example, additional processors 410, 415 may include additional processors that may be the same as processor 410, additional processors that may be heterogeneous or asymmetric to processor 410, accelerators (such as, e.g., graphics accelerators or digital signal processing (DSP) units), field programmable gate arrays, or any other processor. There may be a variety of differences between the physical resources 410, 415 in terms of a spectrum of metrics of merit including architectural, micro-architectural, thermal, power consumption characteristics, and the like. These differences may effectively manifest themselves as asymmetry and heterogeneity amongst processors 410, 415. For at least one embodiment, various processors 410, 415 may reside in the same die package.

FIG. 5 illustrates a block diagram of a second system 500, in accordance with embodiments of the present disclosure. As shown in FIG. 5, multiprocessor system 500 may include a point-to-point interconnect system, and may include a first processor 570 and a second processor 580 coupled via a point-to-point interconnect 550. Each of processors 570 and 580 may be some version of processor 300 as one or more of processors 410,615.

While FIG. 5 may illustrate two processors 570, 580, it is to be understood that the scope of the present disclosure is not so limited. In other embodiments, one or more additional processors may be present in a given processor.

Processors 570 and 580 are shown including integrated memory controller units 572 and 582, respectively. Processor 570 may also include as part of its bus controller units point-to-point (P-P) interfaces 576 and 578; similarly, second processor 580 may include P-P interfaces 586 and 588. Processors 570, 580 may exchange information via a point-to-point (P-P) interface 550 using P-P interface circuits 578, 588. As shown in FIG. 5, IMCs 572 and 582 may couple the processors to respective memories, namely a memory 532 and a memory 534, which in one embodiment may be portions of main memory locally attached to the respective processors.

Processors 570, 580 may each exchange information with a chipset 590 via individual P-P interfaces 552, 554 using point to point interface circuits 576, 594, 586, 598. In one embodiment, chipset 590 may also exchange information with a high-performance graphics circuit 538 via a high-performance graphics interface 539.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another third generation I/O interconnect bus, although the scope of the present disclosure is not so limited.

As shown in FIG. 5, various I/O devices 514 may be coupled to first bus 516, along with a bus bridge 518 which couples first bus 516 to a second bus 520. In one embodiment, second bus 520 may be a Low Pin Count (LPC) bus. Various devices may be coupled to second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to second bus 520. Note that other architectures may be possible. For example, instead of the point-to-point architecture of FIG. 5, a system may implement a multi-drop bus or other such architecture.

Figure 6:
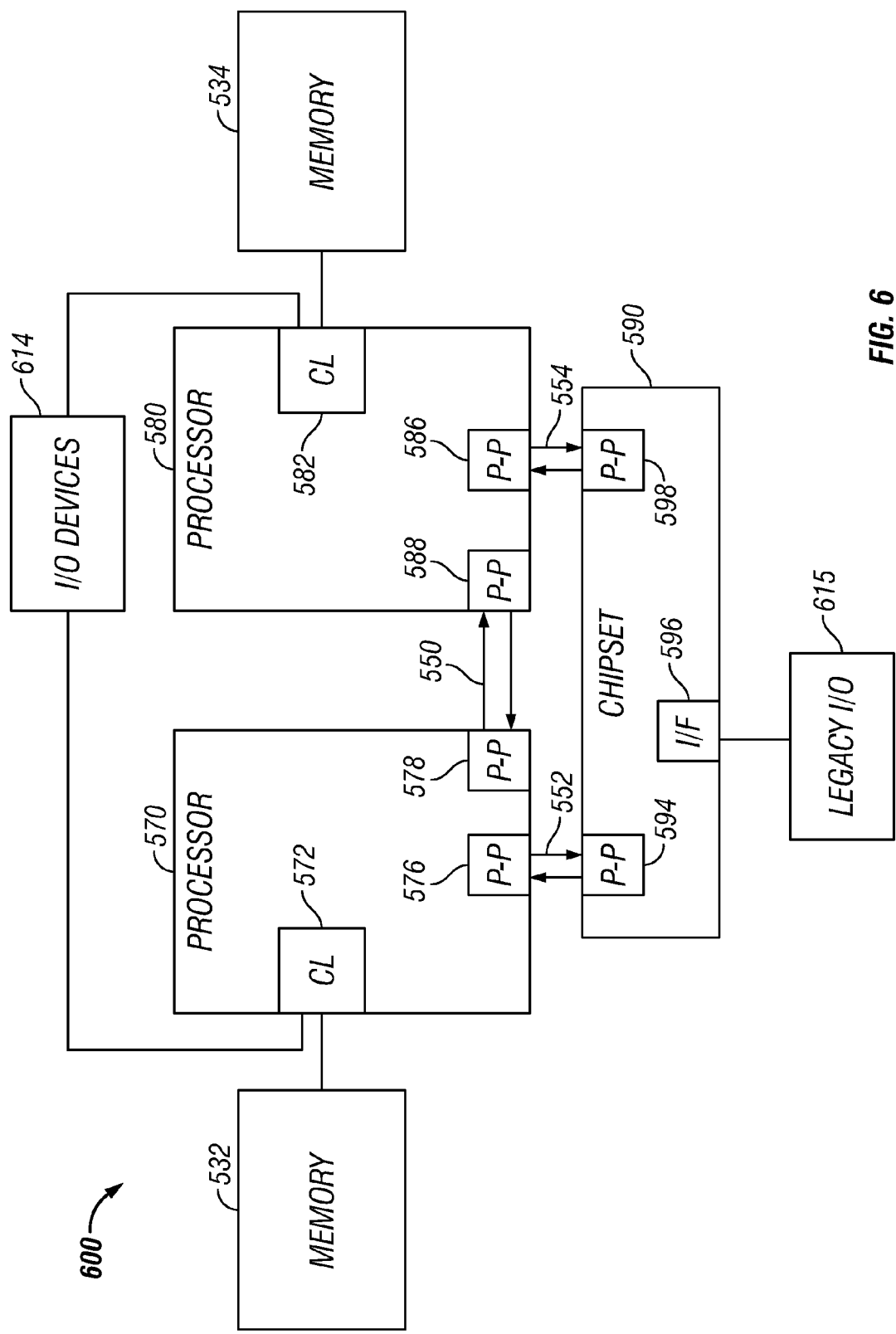
FIG. 6 is a block diagram of a third system in accordance with embodiments of the present disclosure.

FIG. 6 illustrates a block diagram of a third system 600 in accordance with embodiments of the present disclosure. Like elements in FIGS. 5 and 6 bear like reference numerals, and certain aspects of FIG. 5 have been omitted from FIG. 6 in order to avoid obscuring other aspects of FIG. 6.

FIG. 6 illustrates that processors 670, 680 may include integrated memory and I/O Control Logic ("CL") 672 and 682, respectively. For at least one embodiment, CL 672, 682 may include integrated memory controller units such as that described above in connection with FIGS. 3-5. In addition. CL 672, 682 may also include I/O control logic. FIG. 6 illustrates that not only memories 632, 634 may be coupled to CL 672, 682, but also that I/O devices 614 may also be coupled to control logic 672, 682. Legacy I/O devices 615 may be coupled to chipset 690.

Figure 7:
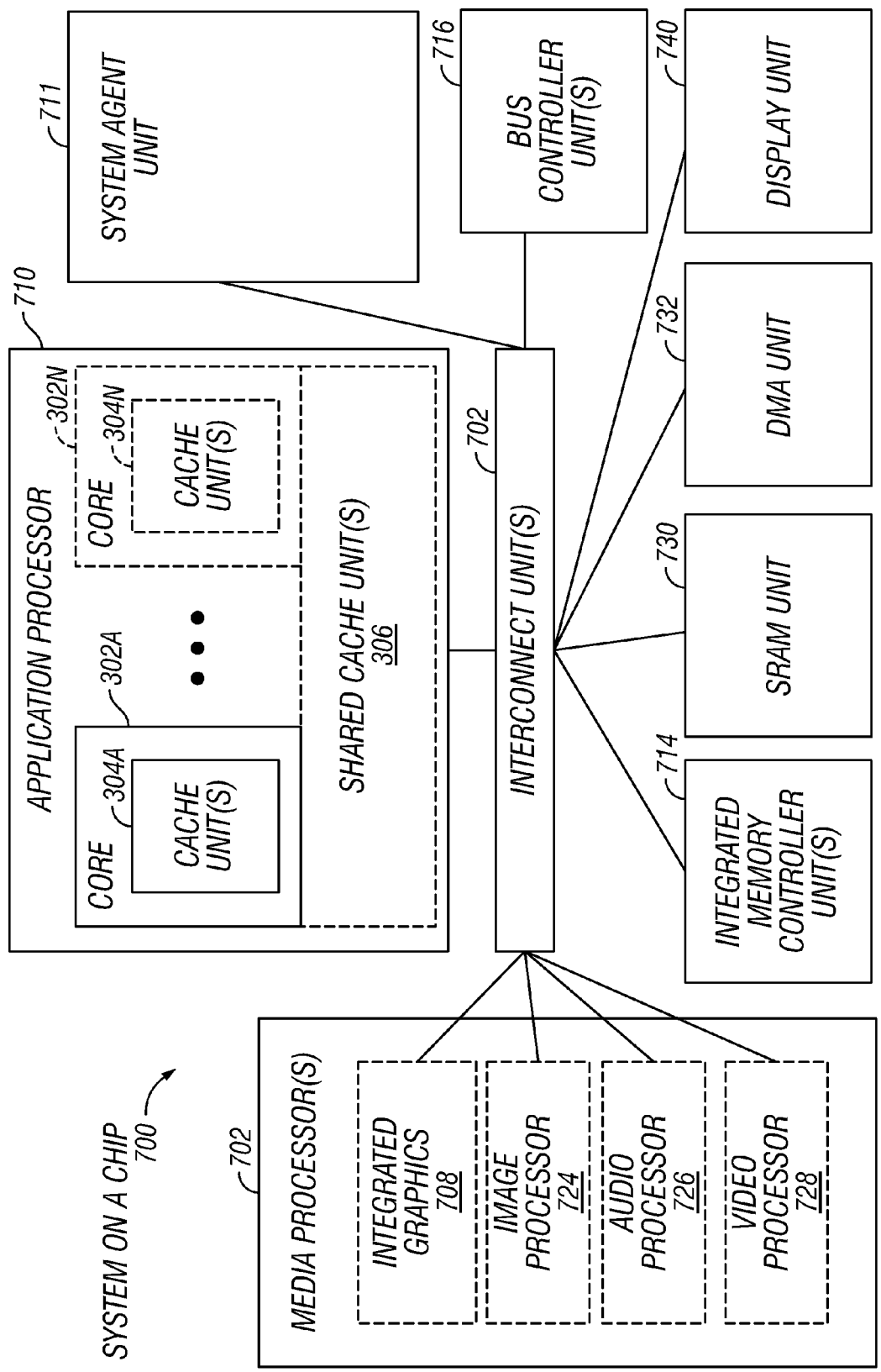
FIG. 7 is a block diagram of a system-on-a-chip, in accordance with embodiments of the present disclosure.

FIG. 7 illustrates a block diagram of a SoC 700, in accordance with embodiments of the present disclosure. Similar elements in FIG. 3 bear like reference numerals. Also, dashed lined boxes may represent optional features on more advanced SoCs. An interconnect units 702 may be coupled to: an application processor 710 which may include a set of one or more cores 702A-N and shared cache units 706; a system agent unit 711; a bus controller units 716; an integrated memory controller units 714; a set or one or more media processors 720 which may include integrated graphics logic 708, an image processor 724 for providing still and/or video camera functionality, an audio processor 726 for providing hardware audio acceleration, and a video processor 728 for providing video encode/decode acceleration; an SRAM unit 730; a DMA unit 732; and a display unit 740 for coupling to one or more external displays.

Figure 8:
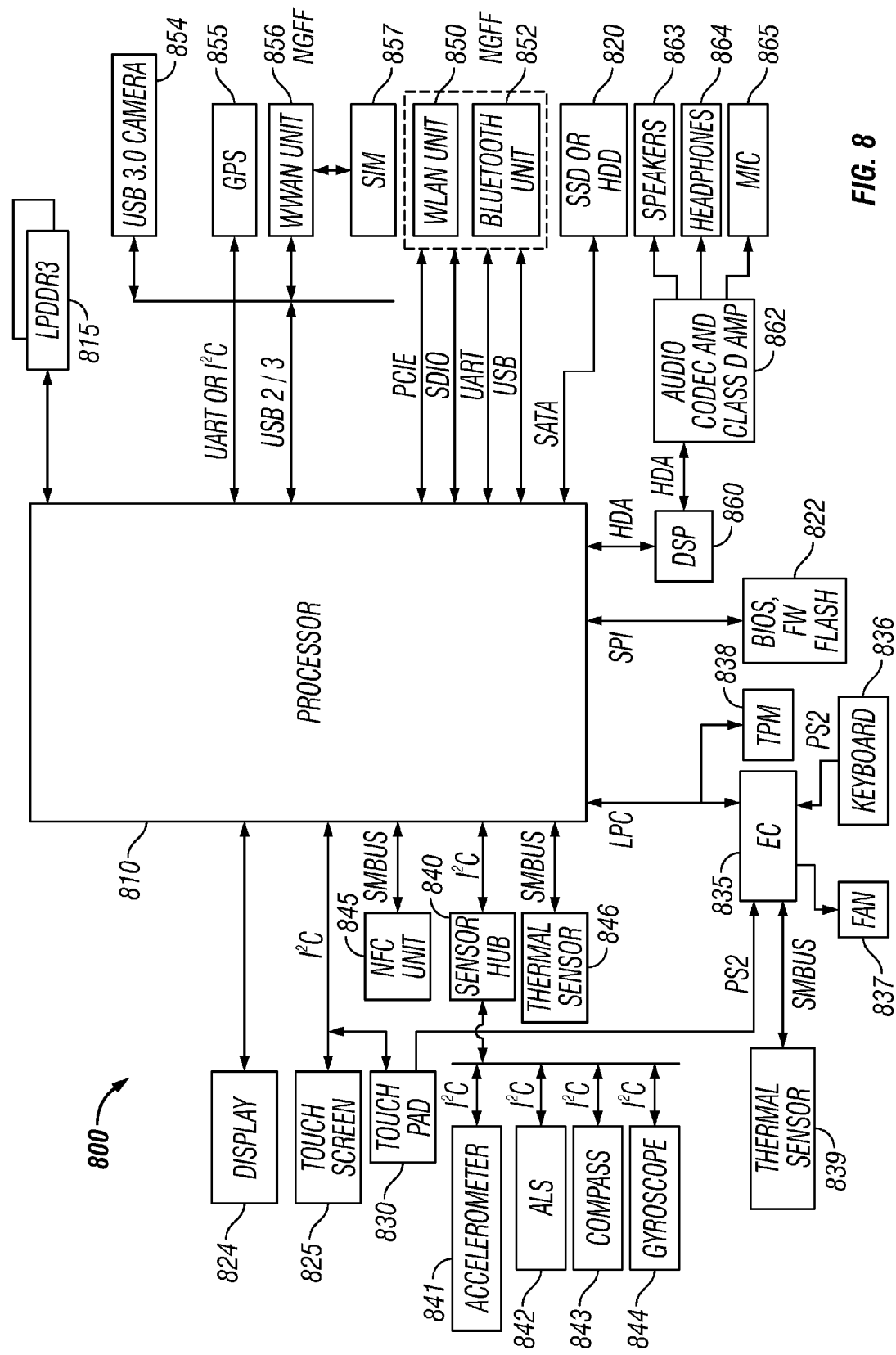
FIG. 8 is a block diagram of an electronic device for utilizing a processor, in accordance with embodiments of the present disclosure.

FIG. 8 is a block diagram of an electronic device 800 for utilizing a processor 810, in accordance with embodiments of the present disclosure. Electronic device 800 may include, for example, a notebook, an ultrabook, a computer, a tower server, a rack server, a blade server, a laptop, a desktop, a tablet, a mobile device, a phone, an embedded computer, or any other suitable electronic device.

Electronic device 800 may include processor 810 communicatively coupled to any suitable number or kind of components, peripherals, modules, or devices. Such coupling may be accomplished by any suitable kind of bus or interface, such as I$^2$C bus, System Management Bus (SMBus), Low Pin Count (LPC) bus, SPI, High Definition Audio (HDA) bus, Serial Advance Technology Attachment (SATA) bus, USB bus (versions 1, 2, 3), or Universal Asynchronous Receiver/Transmitter (UART) bus.

Such components may include, for example, a display 824, a touch screen 825, a touch pad 830, a Near Field Communications (NFC) unit 845, a sensor hub 840, a thermal sensor 846, an Express Chipset (EC) 835, a Trusted Platform Module (TPM) 838, BIOS/firmware/flash memory 822, a DSP 860, a drive 820 such as a Solid State Disk (SSD) or a Hard Disk Drive (HDD), a wireless local area network (WLAN) unit 850, a Bluetooth unit 852, a Wireless Wide Area Network (WWAN) unit 856, a Global Positioning System (GPS), a camera 854 such as a USB 3.0 camera, or a Low Power Double Data Rate (LPDDR) memory unit 815 implemented in, for example, the LPDDR3 standard. These components may each be implemented in any suitable manner.

Furthermore, in various embodiments other components may be communicatively coupled to processor 810 through the components discussed above. For example, an accelerometer 841, Ambient Light Sensor (ALS) 842, compass 843, and gyroscope 844 may be communicatively coupled to sensor hub 840. A thermal sensor 839, fan 837, keyboard 846, and touch pad 830 may be communicatively coupled to EC 835. Speaker 863, headphones 864, and a microphone 865 may be communicatively coupled to an audio unit 864, which may in turn be communicatively coupled to DSP 860. Audio unit 864 may include, for example, an audio codec and a class D amplifier. A SIM card 857 may be communicatively coupled to WWAN unit 856. Components such as WLAN unit 850 and Bluetooth unit 852, as well as WWAN unit 856 may be implemented in a Next Generation Form Factor (NGFF).

Figure 9A:
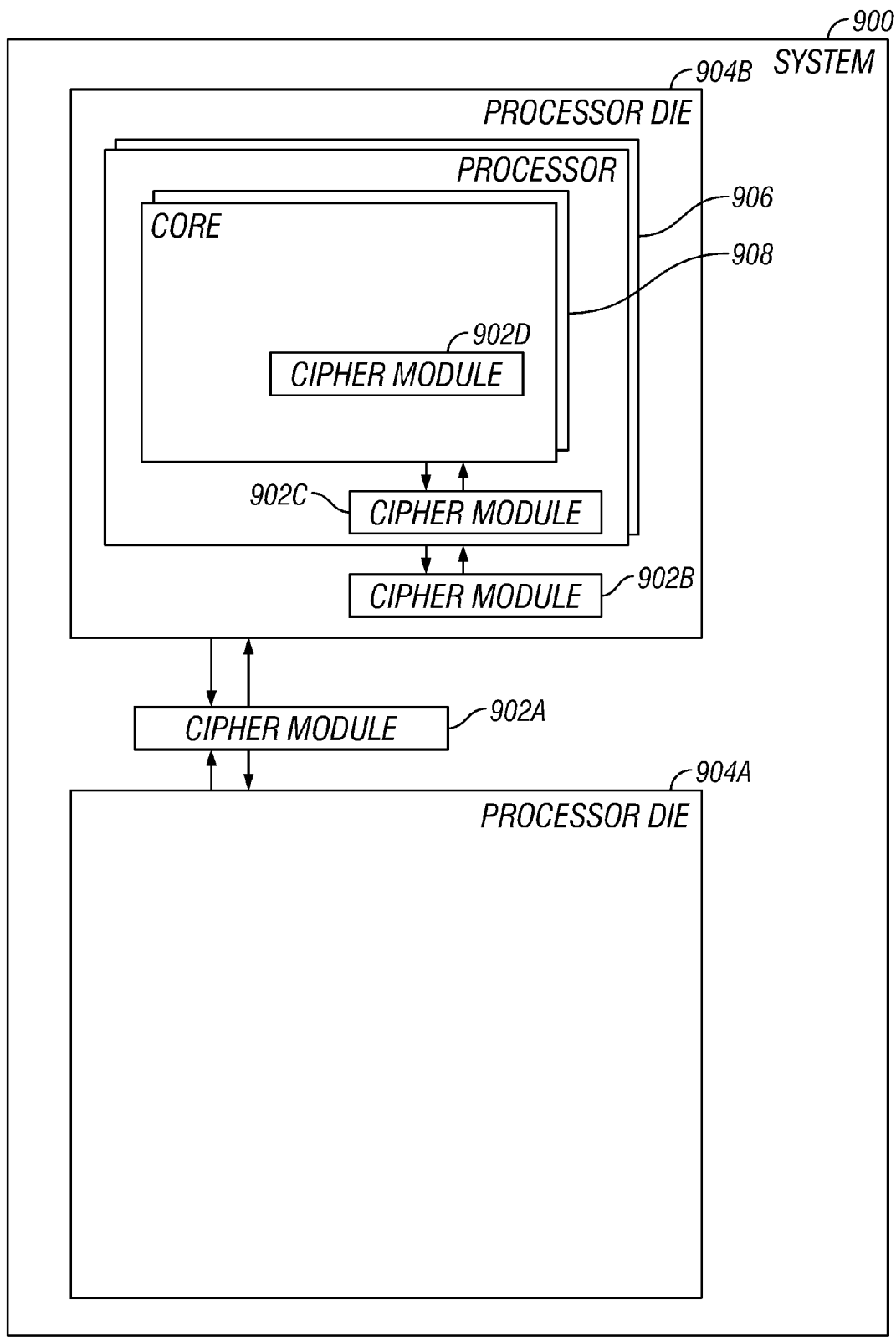
FIG. 9A illustrates an example of a system for implementing a Simon block cipher.

Embodiments of the present disclosure involve an instruction and logic for a Simon block cipher. FIG. 9A illustrates an example system 900 for implementing a block cipher. In one embodiment, such a block cipher may include a Simon block cipher. Simon block ciphers were proposed by "The Simon and Speck Families of Lightweight Block Ciphers" by Beaulieu, et. al., published Jun. 19, 2013. The block ciphers implemented by system 100 may include algorithms for a fixed length of bits. The fixed length of bits may include a block. The algorithms may apply a transformation whose parameters are specified by a key. The key may include a symmetric key, wherein the same key may be used for encryption and decryption. Different types of block ciphers may apply different transformations. For a given type of block cipher, the algorithm of transformation may be unchanging, wherein the variances are defined by the key. Thus, all Simon block ciphers may apply the same algorithm transformation to a given block with a given key. However, Simon block ciphers may be implemented in numerous different ways.

Various portions of system 900 may be implemented by elements shown in FIGS. 1-8. In system 900, a Simon block cipher may be implemented fully or in part by a cipher module 902. Cipher module 902 applies the Simon algorithm to a block given a key. In one embodiment, cipher module 902 may include an entire encryption or decryption unit, wherein given a block and a key, a result will be produced. In another embodiment, cipher module 902 may include a cryptographic primitive for applying the transformation to the block given the key, but may work with any suitable combination or number of other primitives and modules to produce a desired result. Cipher module 902 may accept a block of text and a key and output an encrypted string of the text.

Cipher module 902 may receive a block and a key from any suitable portion of system 900, and may return the result of the transformation. The transformation may function as a hash or encryption function. Cipher module 902 may be implemented to provide hardware acceleration to system 900, such that Simon block cipher operations may be specifically performed by cipher module 902. By specifically performing such operations, cipher module 902 may free up other resources of system 900 to perform other tasks. Cipher module 902 may perform as a hash or encryption function.

Cipher module 902 may implement an iterated block cipher. Cipher module 902 may perform its transformation through multiple iterations or rounds. The result of one round of transformation may be used in later rounds of transformation. Each round of transformation may use a different subkey that is derived from the original key provided as a parameter to cipher module 902. The subkey may include manipulating the original key with a rotating key schedule.

Cipher module 902 may utilize any suitable size of blocks or keys. In one embodiment, cipher module 902 may utilize a block size that is half of the key size. For example, cipher module 902 may utilize a block with thirty-two bits in combination with a key with sixty-four bits; a block with forty-eight bits in combination with a key with ninety-six bits; a block with sixty-four bits in combination with a key with one-hundred twenty-eight bits; a block with ninety-six bits in combination with a key with one-hundred forty-four bits; or a block with one-hundred twenty-eight bits in combination with a key with one-two-hundred fifty-six bits. Cipher module 902 may utilize a block that includes multiple words. For example cipher module 902 may utilize a block of size 2n wherein n-bit words are used.

Given an input of block or text with size 2n and a key of size k, cipher module 902 may return an output of size 2n. The output may be considered the ciphered version of the text of size 2n as transformed by the algorithm of cipher module 902 using the key of size k.

Cipher module 902 may utilize algorithms for its transformation operations on n-bit words, such as a bitwise exclusive-or ("XOR" or "$\oplus$"), a bitwise and ("AND" or "&"), and left circular shifts of a word by j-bits ("$S^j$ [word]"). The transformation performed by cipher module 902 may occur by dividing the total text to be transformed into chunks the size of the defined word.

Figure 9B:
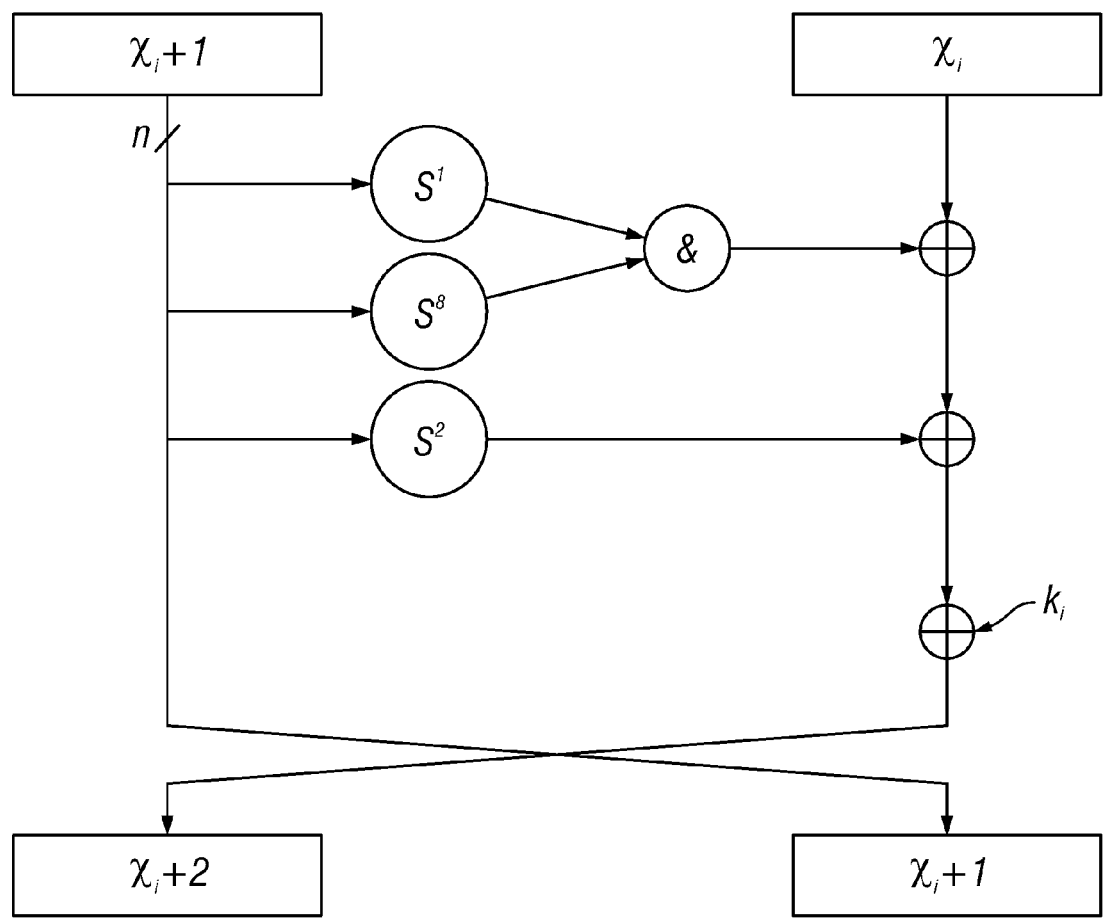
FIG. 9B illustrates a Feistel map for a block cipher.

The transformation of cipher module 902 may be illustrated in the Feistel map shown in FIG. 9B. The transformation as shown in the Feistel map may be expressed as $$R_k(x,y) = (y \oplus f(x) \oplus k, x)$$

where $$f(x) = (Sx \ \& \ S8x) \oplus S2x$$

and k is the round key, specific to a given round. In FIG. 9B, y may be expressed as $x_{i+1}$. These transformations may include the encryption operations for cipher module 902. Furthermore, the inverse of the round function is used for decryption, given as $$R^{-1}_k(x,y) = (y, x \oplus f(y) \oplus k)$$

The round key or subkey may be based upon the parameter key as manipulated by a key schedule. The key schedule used by cipher module 902 may include a number of possible rounds R before the subkey repeats. Furthermore, the key schedule used by cipher module 902 may depend upon the block size, key size, and word size used for its parameters. The key schedule used by cipher module 902 may include a sequence of one-bit round constants that may help eliminate slide properties and circular shift symmetries.

Figure 9C:
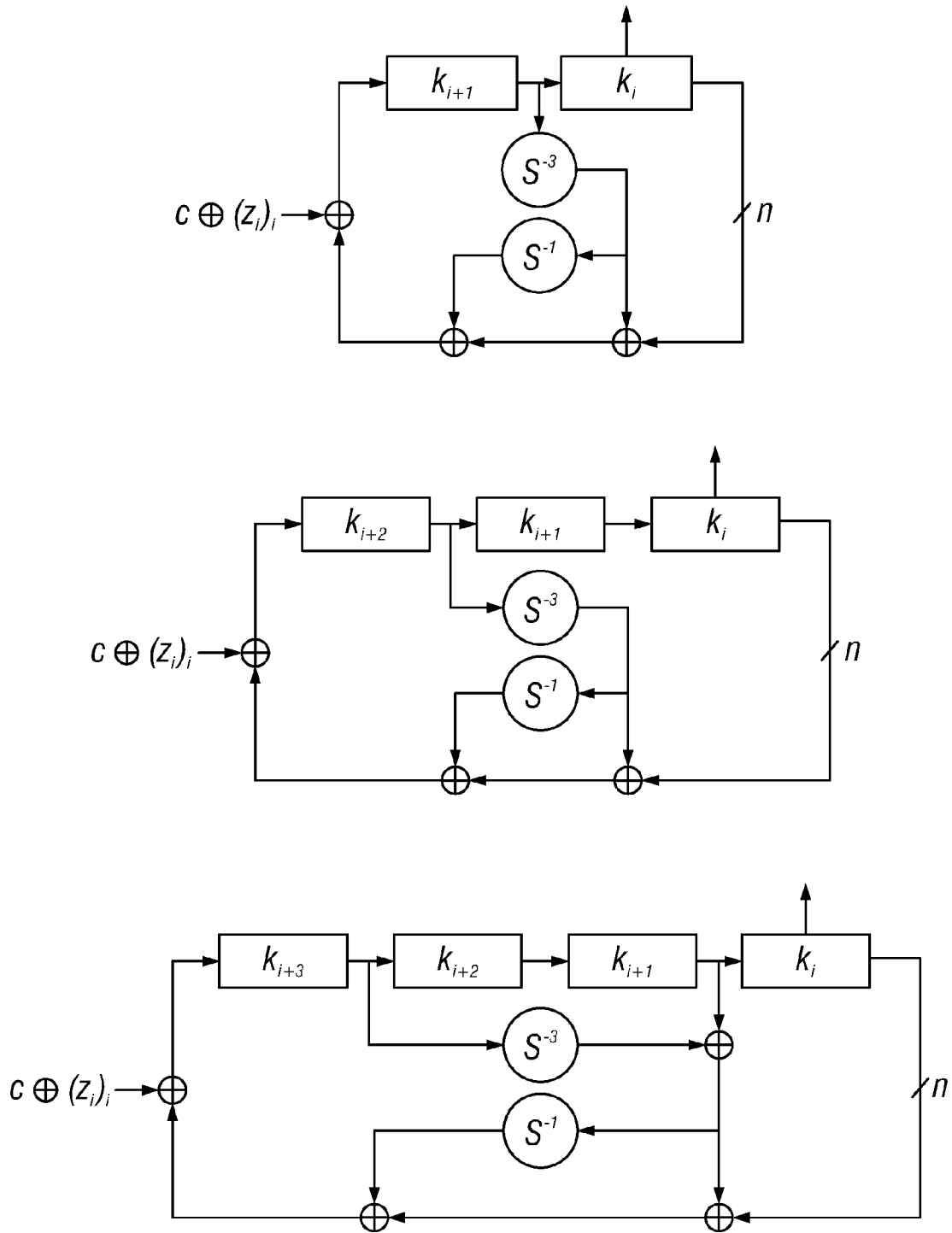
FIG. 9C illustrates key expansion for a given iteration for a block cipher.

Furthermore, cipher module 902 may include any suitable number of key expansions, by which keys for a given round are manipulated based on previous round key values. Such key expansions may provide additional protection against slide properties and other shortcomings. FIG. 9C illustrates key expansion for a given iteration i of cipher module 902. The output codeword c, the selected key schedule constant $z_j$, and previous subkeys $k_i$, $k_{i+1}$, $k_{i+2}$, or $k_{i+3}$ may be used. A key expansion of FIG. 9C may be chosen according to how many key words m are used in the transformation in cipher module 902. The number of key words m may be selected according to the block size and key size used as input to cipher module 902.

Furthermore, cipher module 902 may be implemented in any suitable portion of system 900. The placement of cipher module 902 may depend upon a desired level of integrated operations, convenience, speed, or flexibility. For example, cipher module 902A may reside independently in system 900 and may be accessed by one or more suitable entities of system 900 such as a processor die 904A, 904B. Cipher module 902B may reside on a processor die such as processor die 904B and may be accessed by one or more suitable entities of processor die 904B such as processors 906. Cipher module 902C may reside on a processor as processor 906 and may be accessed by one or more suitable entities of processor 906 such as cores 908. Cipher module 902D may reside on a core such as core 908 and may be accessed by one or more suitable entities of core 908.

Figure 10:
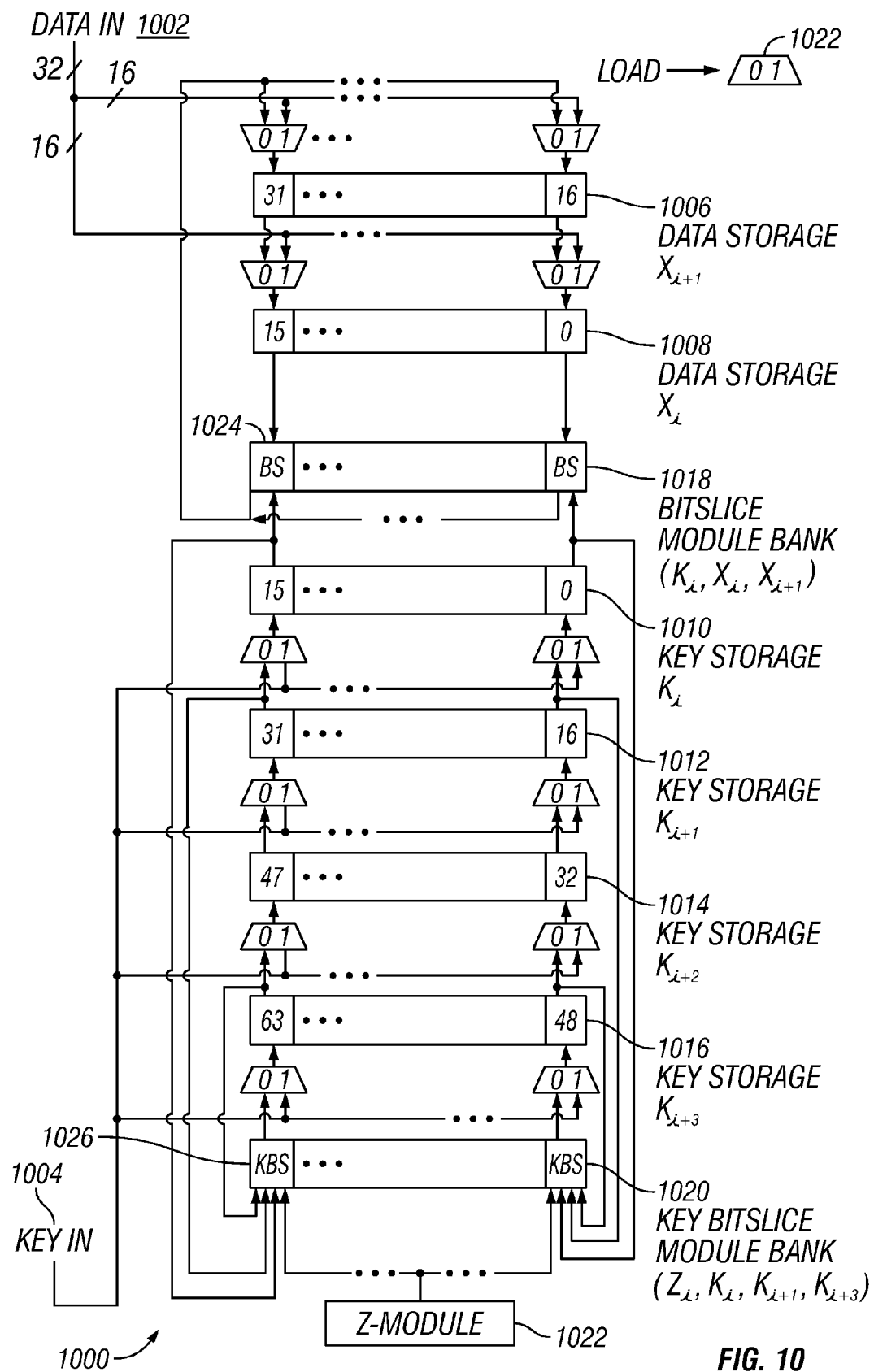
FIG. 10 is an illustration of an example embodiment of a cipher module.
Figure 10:
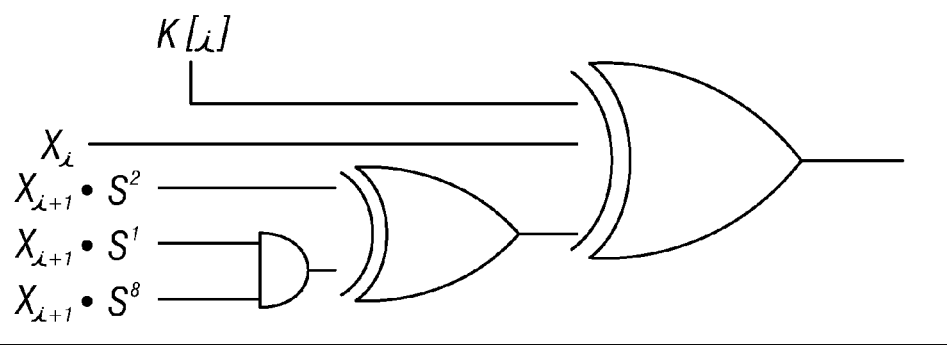
Figure 10:
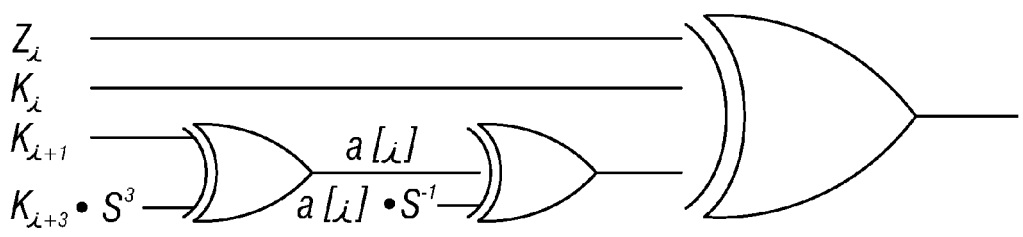
Figure 10:
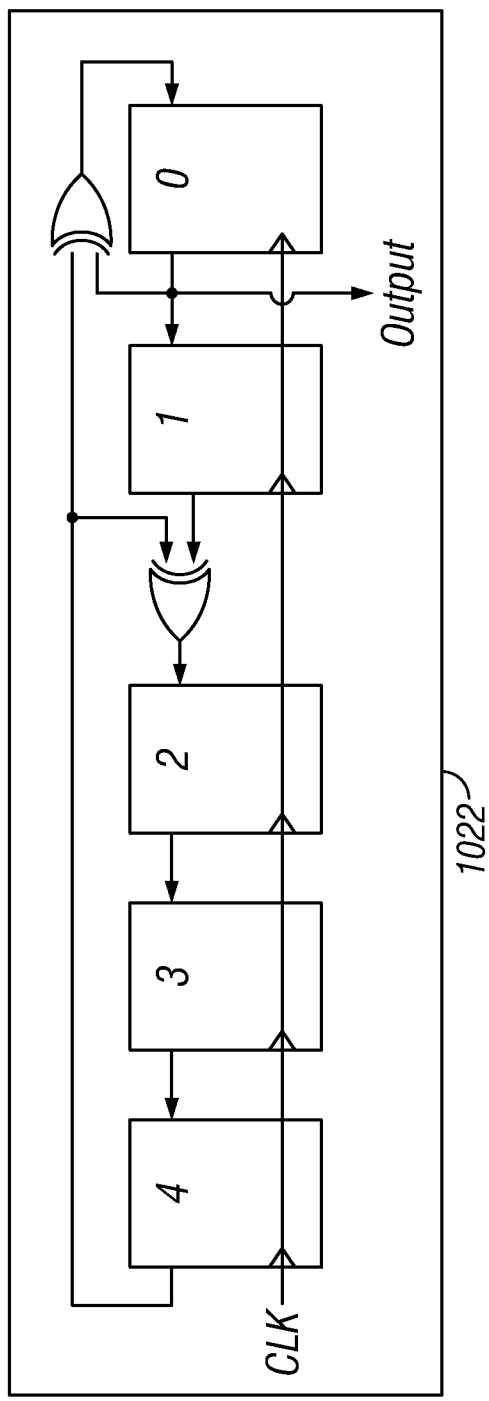

FIG. 10 is an illustration of an example embodiment of a cipher module 1000. Cipher module 1000 may implement, fully or in part, cipher module 902 of FIG. 9. In one embodiment, cipher module 1000 may include a z-module 1022 to provide a constant $z_j$ for use in determining a round key. Z-module 1022 may provide $z_j$ as part of a key schedule as discussed above within the context of FIG. 9. In a further embodiment, z-module 1022 may include an area-efficient left-shift-register-circuit to generate a constant $z_j$.

Cipher module 1000 may fully or in part implement a thirty-two-bit word and sixty-four-bit key Simon block cipher. However, any suitable sizes of words and keys may be used in conjunction with suitable adjustments to the elements of cipher module 1000. Cipher module 1000 may implement a fully-parallel solution for a block cipher wherein all bits within the thirty-two-bit round word and the sixty-four-bit round key are transformed in parallel. The round words for an iteration i may be stored in data storage $x_i$ 1008 (including the lowest sixteen bits) and data storage $x_{i+1}$ 1006 (including bits sixteen through thirty-one). Data storage 1006, 1008 may implement the round word $x_i$ and $x_{i+1}$ components of FIG. 9B. The round keys for an iteration i may be stored in key storage $k_i$ 1010 (including the lowest sixteen bits), key storage $k_{i+1}$ 1012 (including bits sixteen through thirty-one), key storage $k_{i+2}$ 1014 (including bits thirty-two through forty-seven), and key storage $k_{i+3}$ 1016 (including bits sixteen through thirty-two). Key storage 1010, 1012, 1014, 1016 may implement the round keys $k_i$, $k_{i+1}$, $k_{i+2}$, and $k_{i+3}$ illustrated in FIG. 9C.

The operations of the Feistel graph shown in FIG. 9C may be implemented by bitslice modules 1024. Each bitslice module 1024 may perform transformational operations on a segment of data according to the Feistel graph of FIG. 9C. A bitslice module 1024 may be provided for each different bit position of the key storage and the data storage. In the example of FIG. 10, this may include sixteen bitslice modules 1024, which may be grouped together into bitslice module bank 1018. Each bitslice module 1024 may compute two bits ($x_i$ and $x_{i+1}$) of the iteration of the Feistel graph of FIG. 9C, embodying the transformation of cipher module 1000. Specifically, bitslice module 1024 shifts $x_{i+1}$ (1006) to the left one bit, shifts $x_{i+1}$ (1008) to the left eight bits, and performs a bitwise AND on the two results. Then, bitslice module 1024 applies an XOR to this result and $x_i$ (1008). Then, bitslice module 1024 applies an XOR to this result and the result of shifting $x_{i+1}$ (1006) to the left two bits. Then, bitslice module 1024 applies an XOR to this result and the round key (1010). Example logic to perform these operations is illustrated in the more detailed illustration of bitslice module 1024. Thus, each bitslice module 1024 accepts as input a parallel one of data storage $x_i$ 1008, a parallel one of data storage $x_{i+1}$ 1006, and a parallel one of key storage $k_i$ 1010. After all thirty-rounds of cipher operations are complete, input data 1002 is transformed using an input key 1004 and the output of bitslice module bank 1018 makes up the output of block cipher 1000.

The operations of the four-key expansion shown in FIG. 9C may be implemented by key bitslice module bank 1020. Key bitslice module bank 1020 may include individual elements of logic such as key bitslice modules 1026 corresponding to the number of parallel computations performed by block cipher 1000. This in turn may correspond to each different bit position of the key storage and the data storage. In the example of FIG. 10, this may include sixteen key bitslice modules 1026. Each key bitslice module 1026 may compute the round key $k_{i+3}$ (1016) which may be propagated for subsequent round key portions (1010, 1012, 1014). Specifically, key bitslice module 1026 applies an XOR to $k_{i+3}$ (1016) shifted right three bits and $k_{i+1}$ (1012), yielding a first result. Key bitslice module 1026 applies an XOR to the first result and to $k_i$ (1010), yielding a second result. Key bitslice module 1026 applies an XOR to the first result shifted right by a bit and the second result, yielding a third result. Key bitslice module 1026 applies an XOR to the third result and to a key schedule constant provided by z-module 1022. The result is fed to $k_{i+3}$ (1016). During operation of the four-key expansion, the current round key ki is made available for use by, for example, bitslice modules 1024. Example logic to perform these operations is illustrated in the more detailed illustration of key bitslice module 1026. Thus, each key bitslice module 1026 accepts as input a parallel one of key storage $k_i$ 1010, a parallel one of key storage $k_{i+1}$ 1012, and a parallel one of key storage $k_{i+3}$ 1016, and the constant from the z-module 1022. Each key bitslice module 1026 outputs the determination to a parallel one of key storage $k_{i+3}$ 1016.

Block ciphers 1000 may include any suitable number of elements to accomplish parallel operations of the transformation. For example, loading of registers for data and key storage may be gated by multiplexers 1022, which synchronize filling such registers using a load signal. At the end of a cycle, round output is written into a data register for the next round computation. The output of round keys is similarly produced by each key bitslice module 1026 consuming a one-bit round constant from z-module 1022.

Z-module 1022 may output a stream of constants, given the particular word and key sizes of cipher module 1000, of "11111010001001010110000111100110". If cipher module 1000 included other word or key sizes, a different appropriate constant may be selected according to the Simon algorithm. To output such a stream of constants, a shift register of a number of bits equal to the width of this constant stream may be used. For example, given the thirty-one different constants, z-module 1022 may include a shift register of thirty-one bits. However, in one embodiment z-module 1022 may be implemented logic to reduce the number of flip-flops, latches, or other memory locations necessary to store the constant stream.

The expanded view of z-module 1022 illustrates this reduced usage of flip-flops in FIG. 10. Instead of thirty-one sequential flip-flops to implement a shift register for the stream "11111010001001010110000111100110" five may be used. The output of the lowest flip-flop, "0", may be the output of z-module 1022. Furthermore, the output of flip-flop "0" may be routed to flip-flop "1". In addition, an XOR may be applied to the output of flip-flop "0" and the output of flip-flop "4". The result of this XOR may be sent to the input of flip-flop "0". An XOR may be applied to the output of flip-flop "1" and the output of flip-flop "4", and the result may be routed to the input of flip-flop "2". The output of flip-flop "2" may be routed to flip-flop "3", and the output of flip-flop "3" may be routed to flip-flop "4."

Figure 11:
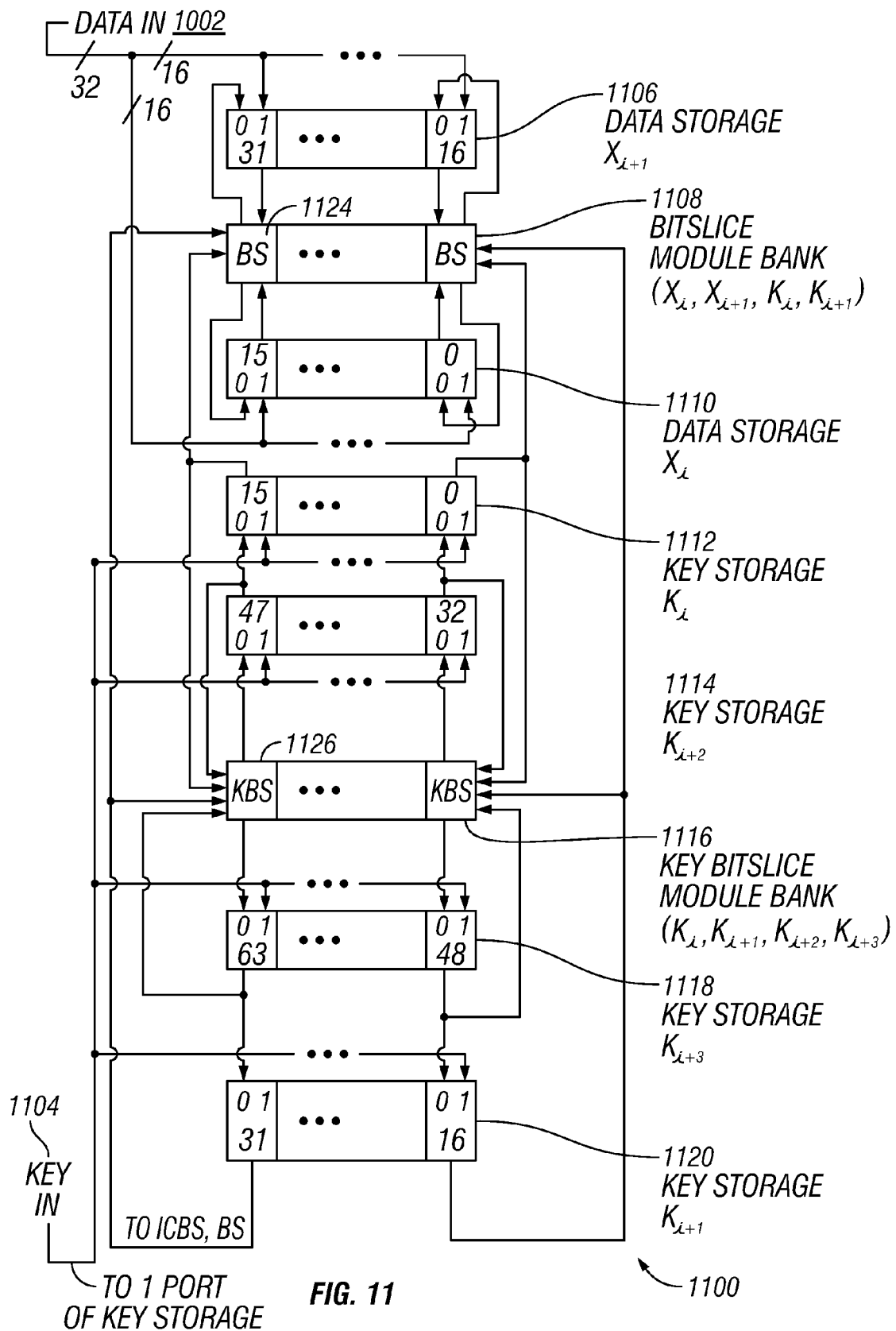
FIG. 11 is an illustration of another example embodiment of a cipher module.
Figure 11:
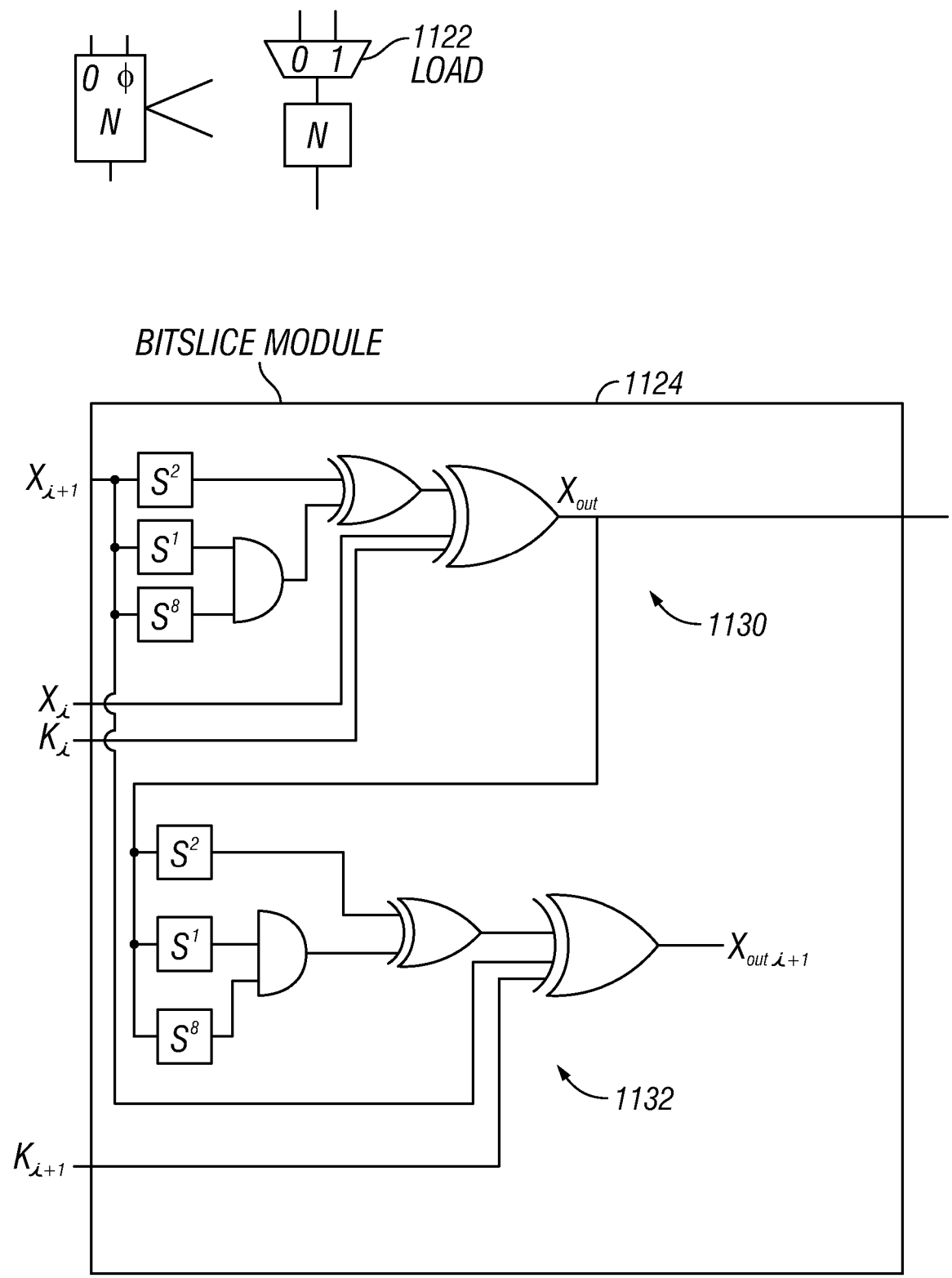
Figure 11:
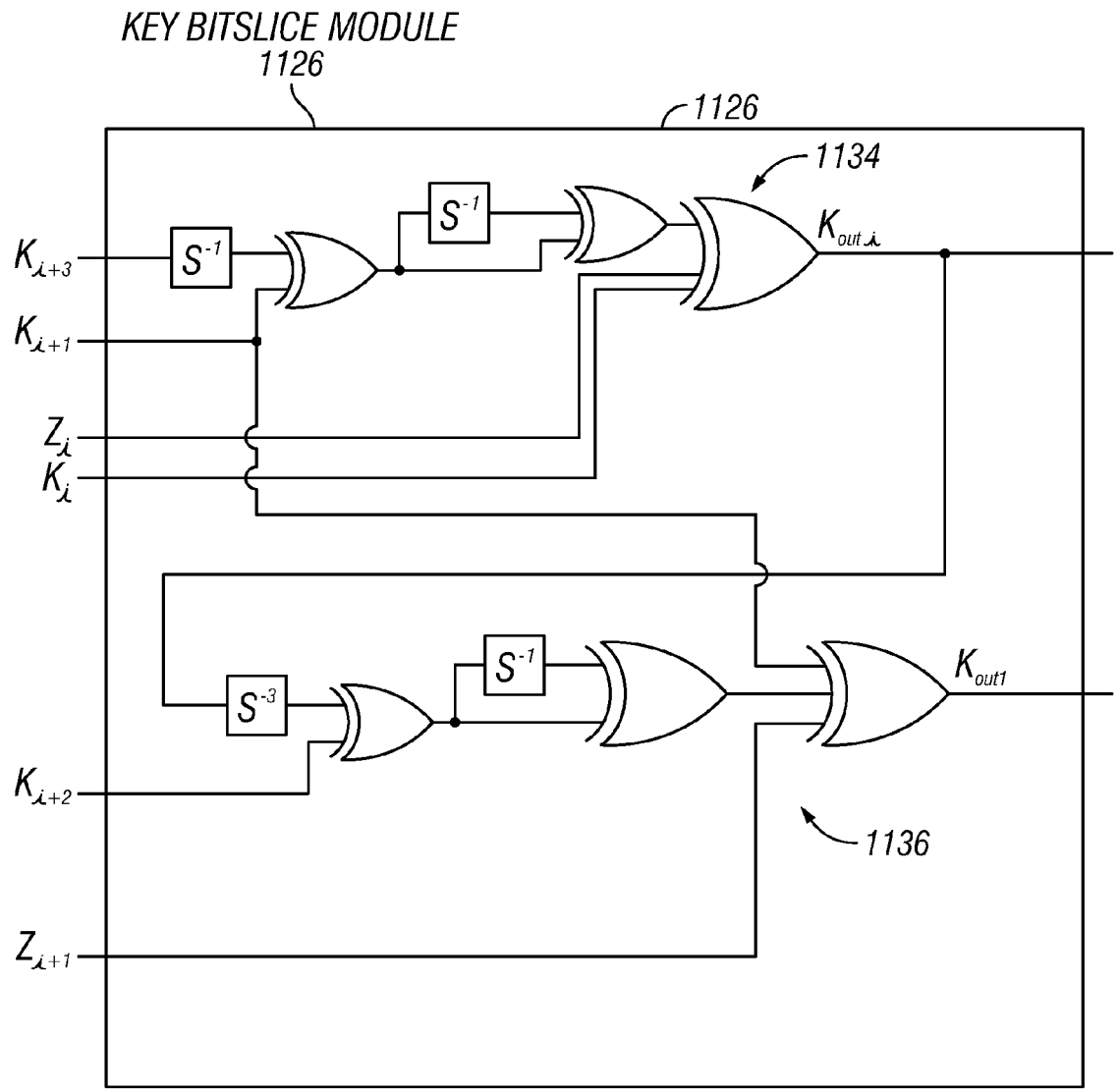
Figure 11:
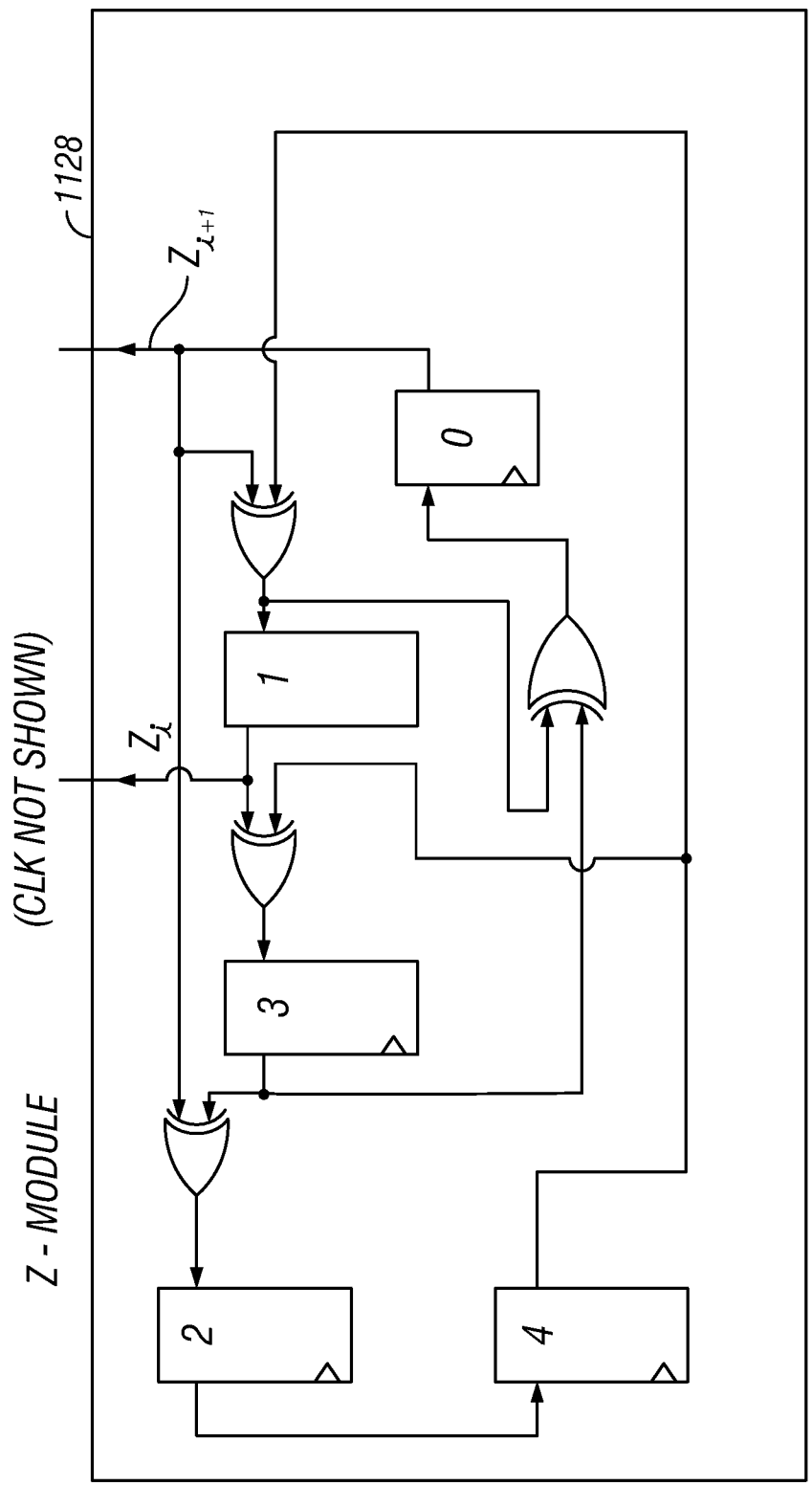

FIG. 11 is an illustration of another example embodiment of a cipher module 1100. Cipher module 1100 may implement, fully or in part, cipher module 902 of FIG. 9. In one embodiment, cipher module 1100 may compute and store the result of two successive rounds every cycle. Furthermore, cipher module 1100 may utilize N/2 cycles to complete an N-round encryption. In a further embodiment, cipher module 1100 may include bitslice modules 1124 that may consume two round keys per clock cycle to produce two outputs. Furthermore, cipher module 1110 may include key bitslice modules 1126 that generate two successive round keys each cycle. In order to support multiple round key generation each cycle, cipher module 1110 may include key storage that advances by two positions each cycle. Furthermore, cipher module 1110 may include a z-module 1128 that provides successive constants each cycle for key scheduling.

Bitslice modules 1124 may implement the functionality illustrated in the Feistal graph FIG. 9B. However, bitslice module 1124 may further implement two successive computations at a time. Furthermore, key bitslice modules 1126 may implement the functionality illustrated in the key expansion of FIG. 9C. However, key bitslice modules 1126 may further implement two successive computations at a time. Z-module 1128 may implement the performance of z-module 1022. However, z-module 1128 may further implement two successive computations at a time.

Performance of block cipher 1100 may be made in parallel fashion. Bits of input data 1102 and key 1104 may be computed in parallel in sizes as previously presented in FIG. 10. Routing of outputs of data or key storage may be made into successive data or key storage registers. Multiplexers 1022 may gate loading of data into data or key storage according to a load signal. In one embodiment, routing of outputs of data or key storage may be made into additional successive data or key storage registers. The routing may be performed to alternative gates on multiplexers 1022, such that a given data or key storage register will load data from a storage register before the preceding storage register. For example, key storage $k_{i+1}$ 1120 may be loaded with values from the key storage $k_{i+3}$ 1118. By connecting data and key storage registers in such a by-two configuration, cipher module 1100 may perform two round evaluations per cycle. When the two evaluations are completed, the next data and keys are loaded accordingly. Bitslice modules 1124 and key bitslice modules 1126 may account for the by-two loading, as discussed below.

In one embodiment, bitslice modules 1124 will accept input from key storage $k_{i+1}$ 1112 in addition to accepting input from key storage $k_i$ 1114, data storage $x_i$ 1110, and data storage $x_{i+1}$ 1106. In another embodiment, key bitslice modules 1126 will accept input from key storage $k_{i+2}$ 1114 in addition to accepting input from key storage $k_i$ 1112, key storage $k_{i+1}$ 1120, key storage $k_{i+3}$ 1118, and z-module 1128.

As shown in the more detailed view of bitslice module 1124, two outputs are determined in parallel, wherein bitslice module 1124 includes two copies of transformation logic 1130, 1132. Bitslice module 1124 routes inputs $k_i$, $x_i$ and $x_{i+1}$ through the first set of transformation logic 1130 to produce the first output of the cycle for cipher module 1100. Furthermore, bitslice module 1124 routes inputs $k_{i+1}$ and $x_{i+1}$, along with the output of transformation logic 1130, through the second set of transformation logic 1132 to produce the second output of the cycle for cipher module 1100. The two outputs include two successive rounds of transformed data. By routing inputs $k_{i+1}$ and $x_{i+1}$, along with the output of transformation logic 1130, through the second set of transformation logic 1132, bitslice module 1124 may apply the successive set of parameters.

Furthermore, as shown in the more detailed view of key bitslice module 1126, two successive round keys are determined in parallel, wherein key bitslice module 1126 includes two copies of key expansion logic 1134, 1136. Key bitslice module 1126 routes inputs $k_{i+3}$, $k_{i+1}$, and z-module's constant at a first iteration ($z_i$), and $k_i$ through the first set of transformation logic 1134 to produce the first round key of the cycle for use elsewhere in cipher module 1100. Furthermore, key bitslice module 1126 routes inputs $k_{i+1}$, $k_{i+2}$, and z-module's constant at a second iteration ($z_{i+1}$), along with the output of transformation logic 1134, through the second set of transformation logic 1136 to produce the second round key. The two outputs include two successive round keys.

In the more detailed view of z-module 1128, additional successive constants are output when compared to z-module 1022. This may be accomplished by, for example, routing the output of flip-flop "1" to the additional output of z-module 1128. Furthermore, if z-module 1128 were implemented as a flat shift register, rather than the logic illustrated in FIG. 11, an output for iteration i+1 would be made from the element next to the element generating the existing output.

Figure 12:
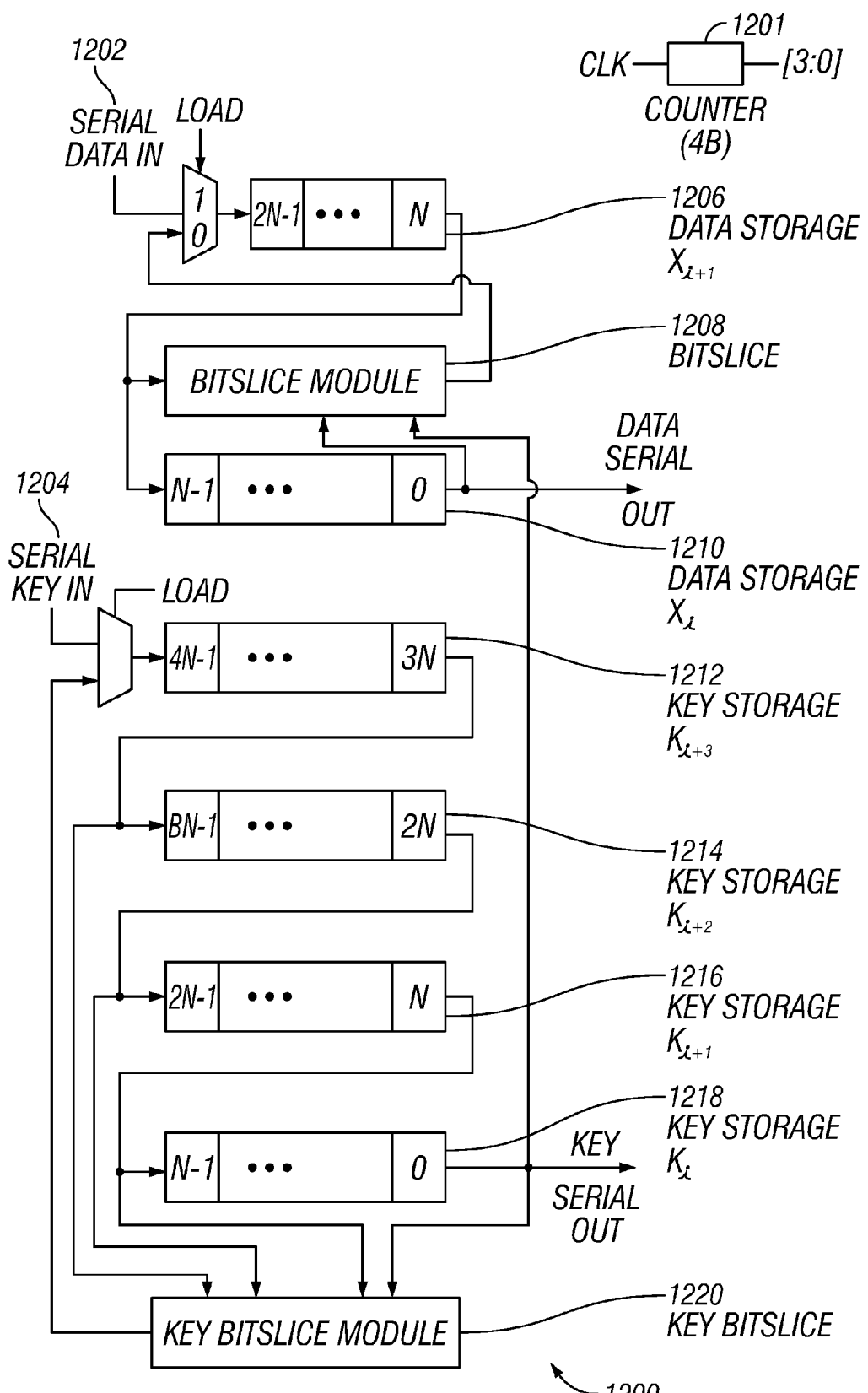
FIG. 12 is an illustration of an example embodiment of a cipher module for serial operation.
Figure 12:
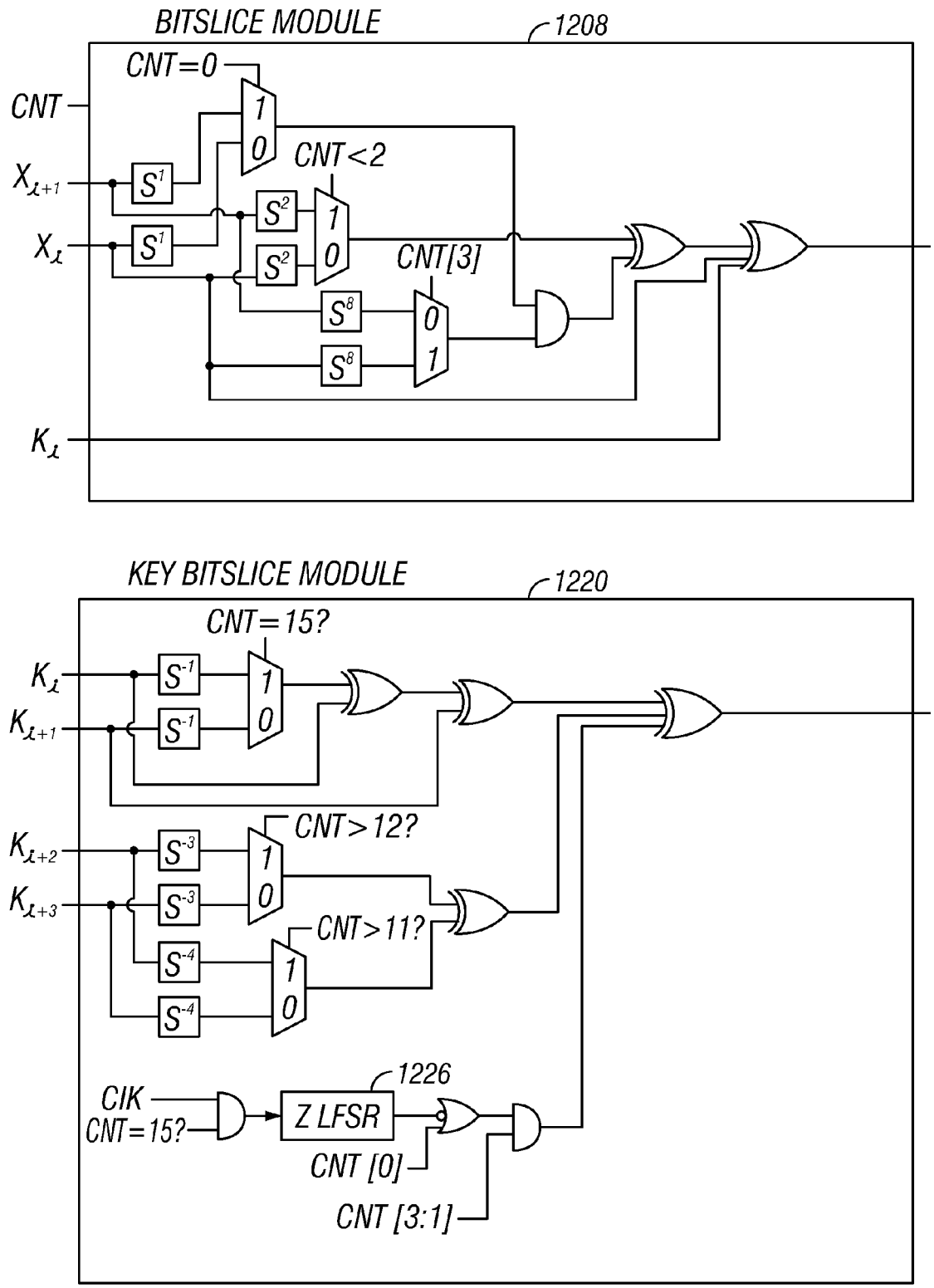

FIG. 12 is an illustration of an example embodiment of a cipher module 1200 for serial operation. Cipher module 1200 may implement, fully or in part, cipher module 902 of FIG. 9. In one embodiment, cipher module 1200 may apply a single bitslice computation per cycle to determine an output from its transformation logic. In another embodiment, cipher module 1200 may apply a single key generation per cycle. In comparison to a parallel solution, such as those in FIGS. 10 and 11, such a bit-serial operation of cipher module 1200 may have much less throughput. However, cipher module 1200 may be implemented on less combinational area than such parallel implementations.

Cipher module 1200 may employ a sixteen-bit word-size datapath, analogous to the word sizes used in FIGS. 10 and 11. In cipher module 1200, output of bitslice module 1208 may be written to the top of data storage $x_{i+1}$ 1206. Furthermore, output of key bitslice module 1220 may be written to the top of key storage $k_{i+3}$ 1212. During each cycle, data may be passed from high to low within a given storage 1206, 1210, 1212, 1214, 1216, 1218, 1220. Furthermore, when data is to exit the given storage, it may pass to a successive storage (i.e., i+3 to i+2, to i+1, to i).

In one embodiment, cipher module 1200 may include a counter 1201 to determine what position of a given word is being calculated. The size of the counter may depend on the size of the words used in cipher module. In the example of FIG. 12, counter 1201 may include four bits to track the sixteen different positions of the storage in cipher module 1200. Cipher module 1200 may issue one round of transformed data every sixteen clock cycles.

Bitslice module 1208 may accept input in the form of individual bits taken from the bottom of data storage $x_{i+1}$ 1206, data storage $x_i$ 1210, and key storage $k_i$ 1218. Bitslice module 1208 may output individual bits which may be the output of cipher module 1200. Key bitslice module 1220 may accept input in the form of individual bits taken from the bottom of key storage $k_i$ 1218, key storage $k_{i+1}$ 1216, key storage $k_{i+3}$ 1212, and a z-module 1226. The z-module may be implemented in any suitable manner, such as in FIG. 10 or 11. The output of key bitslice module 1220 may be serialized but applied to $k_{i+3}$. Input 1202 may be serialized, as may be the input key 1204.

As processed bits are written into a most-significant-bit position of a given storage, any word-size rotate operations (such as those used within key expansion or round calculations) that depend on unprocessed bits at those locations may have to accommodate for such unprocessed bits. Bitslice module 1208 and key bitslice module 1220 may use the bit counter value to multiplex between storage positions to account for unprocessed bits.

In one embodiment in the expanded view of bitslice module 1208, the output of shift operations as part of implementing the Feistel graph of FIG. 9B may be optionally held. These may be held if insufficient bit processing has been performed such that meaningful data would reside in the referenced locations. In another embodiment in the expanded view of key bitslice module 1220 the output of shift operations as part of implementing key expansion as shown in FIG. 9C may be similarly held. These may be held if insufficient bit processing has been performed to provide meaningful data.

In one embodiment, the operation of the output of the z-module 1226 may be held to match the serial operation elsewhere in block cipher 1200. For example, a clock of z-module 1226 may be gated by the count of counter 1201 such that the constant that is output from z-module 1226 remains the same until a full round of processing is completed.

Figure 13:
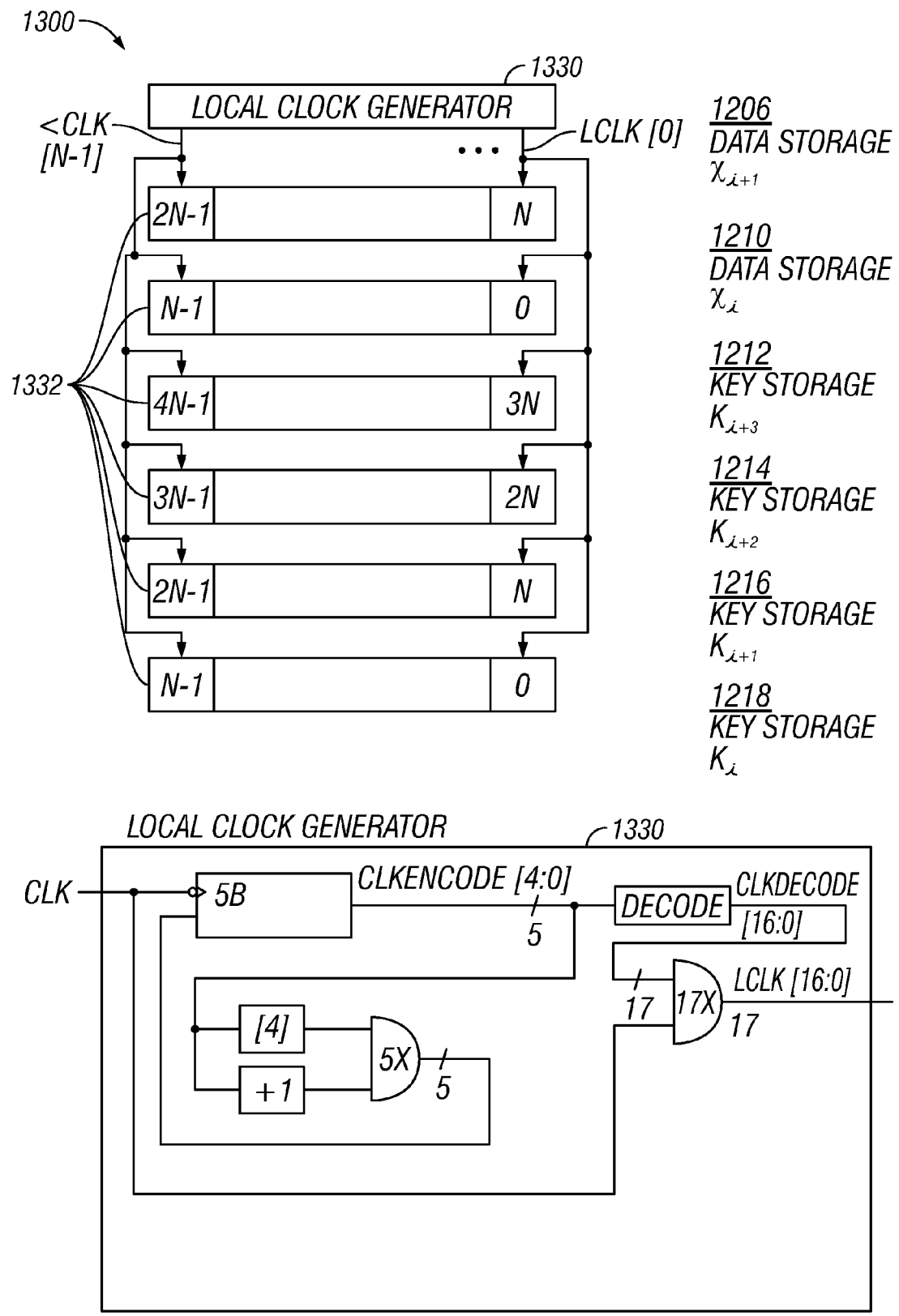
FIG. 13 is an illustration of another example embodiment of a cipher module for serial operation.

FIG. 13 is an illustration of another example embodiment of a cipher module 1300 for serial operation. Cipher module 1300 may implement, fully or in part, cipher module 902 of FIG. 9. Furthermore, cipher module 1300 may be implemented in part by cipher module 1200 of FIG. 12. Elements not shown in cipher module 1300 may nonetheless be present and may include any suitable portion of cipher module 1200.

In one embodiment, cipher module 1300 may use latch-based ripple-shift-registers to store values in its data and key storage. Such an implementation may replace storage using all flip-flops for key or data storage. In such an embodiment, storage 1206, 1210, 1212, 1214, 1216, 1218, which are now implemented as ripple shift-registers, may each include an additional storage latch 1332. A storage latch 1332 may be placed at a boundary of the storage, such as at the top of the storage. Storage latch 1332 may be implemented by any suitable latch.

In another embodiment, cipher module 1300 may include local clock generator 1330. Local clock generation 1330 may be communicatively coupled to each storage latch 1332. For each bit-wise operation performed by cipher module 1300, local clock generator 1330 may issue a local clock signal. The local clock signal may cause data in storage to ripple through storage in an opposite direction from the data flow of round computation.

Figure 14:
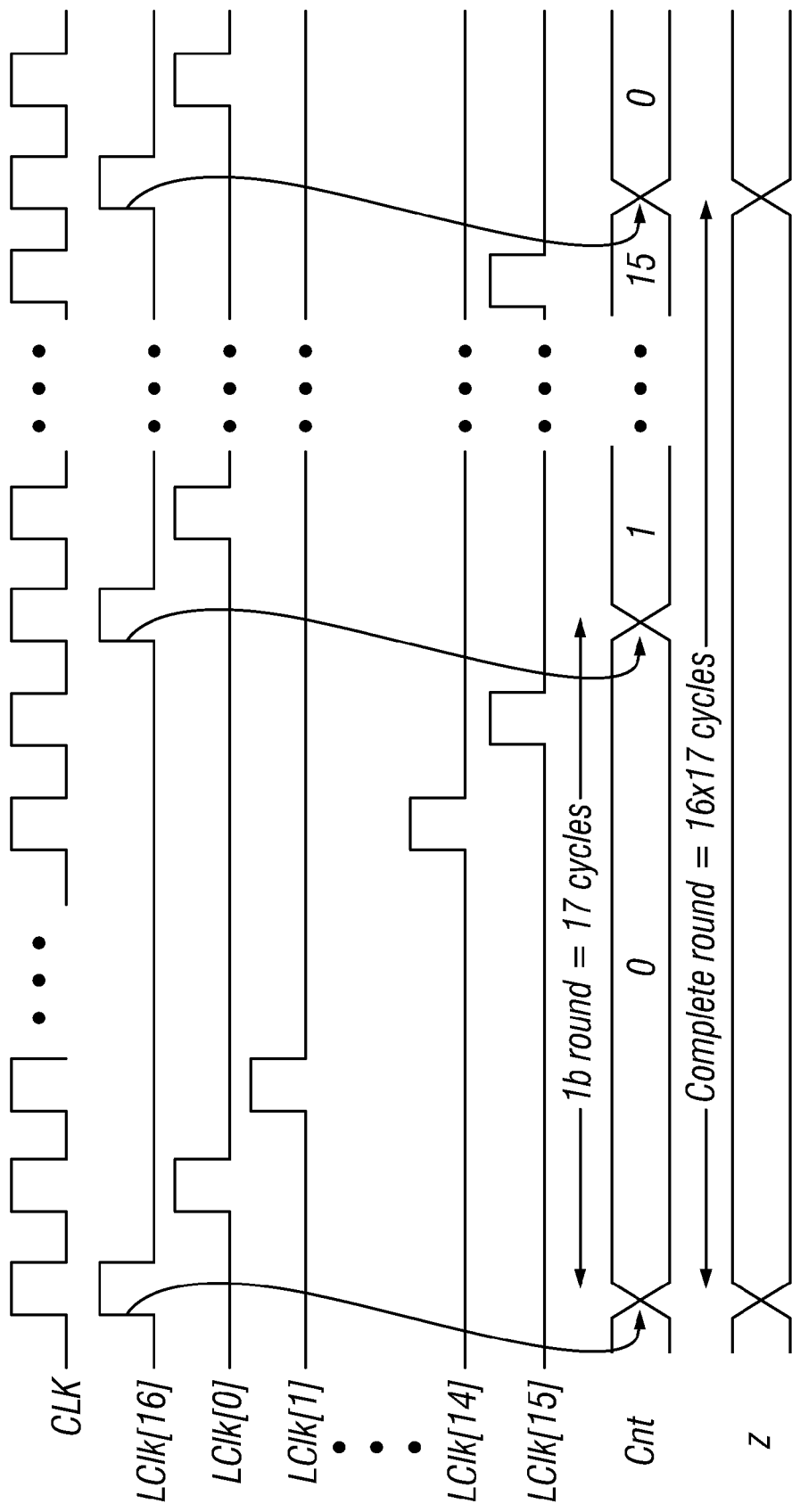
FIG. 14 is a timing diagram for local clock generation in a cipher module.

An expanded view of local clock generator 1330 is illustrated. Local clock generator 1330 may include a five-bit counter and a decoder. The decoder may translate five-bit to seventeen-bit logic to generate a clock gating signal for each bit in the word as shown in the timing diagram of FIG. 14. As each bit-wise computation may require seventeen clock cycles, a full round of computation may thus require 272 clock cycles. The four-bit counter updates each time a bitwise computation is made Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system may include any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, Compact Disk Read-Only Memories (CD-ROMs), Compact Disk Rewritables (CD-RWs), and magneto-optical disks, semiconductor devices such as Read-Only Memories (ROMs), Random Access Memories (RAMs) such as Dynamic Random Access Memories (DRAMs), Static Random Access Memories (SRAMs), Erasable Programmable Read-Only Memories (EPROMs), flash memories, Electrically Erasable Programmable Read-Only Memories (EEPROMs), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part-on and part-off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:
1. A processor, comprising:
an input circuit including circuitry to:
  accept a symmetric key and a data input; and
  divide the data input into a higher-ordered data storage register and a lower-ordered data storage register; and
a Simon block cipher, including:
  a data transformation circuit including circuitry to produce a transformed output, the transformed output based upon:

content of the higher-ordered data storage register shifted three bits to the left, one bit to the left, and two bits to the left;
content of the lower-ordered data storage register; and
content of a round key storage register;
a constant generator; and
a key expansion circuit including circuitry to determine a round key and store the round key in the round key storage register, the round key determination based upon the symmetric key, a previous round key, and a value from the constant generator;
wherein:
the constant generator includes circuitry to output a successive one of a list of n constants each clock cycle;
the constant generator includes circuitry to store values of the n constants in m storage units; and
m is less than n.

2. The processor of claim 1, wherein the constant generator further includes circuitry to:
output one of a list of seventeen constants each clock cycle; and
store values of the seventeen constants in five flip-flops.

3. The processor of claim 1, wherein:
the m storage units are ordered from lowest to highest; and
the constant generator further includes circuitry to:
output the value from the lowest storage unit; and
each clock cycle, update the lowest storage unit with the result of an exclusive-or operation on content of the lowest storage unit and content of the highest storage unit.

4. The processor of claim 3, wherein the constant generator further includes circuitry to, each clock cycle, update content of the third-lowest storage unit with the result of an exclusive-or operation on content of the second-lowest storage unit and content of the highest storage unit.

5. A processor, comprising:
an input circuit including circuitry to:
accept a symmetric key and a data input; and
divide the data input into a higher-ordered data storage register and a lower-ordered data storage register; and
a Simon block cipher, including:
a data transformation circuit including circuitry to:
produce a first transformed output in a clock cycle, the transformed output based upon:
content of the higher-ordered data storage register shifted three bits to the left, one bit to the left, and two bits to the left;
content of the lower-ordered data storage register; and
content of a lower-ordered round key storage register;
produce a second transformed output in the clock cycle, the transformed output based upon:
the first transformed output shifted three bits to the left, one bit to the left, and two bits to the left;
content of the higher-ordered data storage register; and
content of a higher-ordered round key storage register;
a constant generator; and
a key expansion circuit including circuitry to:
determine a first round key and a second round key; and
store the first round key in the lower-ordered round key storage register and the second round key in the higher-ordered round key storage.

6. The processor of claim 5, wherein the key expansion circuit further includes circuitry to:
determine the first round key based upon a previous round key;
determine the second round key based upon the previous round key and the first round key, the first round key different than the second round key.

7. The processor of claim 6, wherein the circuitry to determine the first round key and the second round key is further to determine the first round key and the second round key in the clock cycle.

8. The processor of claim 6, wherein the first round key and the second round are successive keys.

9. The processor claim 6, where the key expansion circuit further includes circuitry to:
determine the first round key based upon the previous round key and a first constant of the constant generator; and
determine the second round key based upon the previous round key, the first round key, and a second constant of the constant generator, wherein the first constant and second constant are successive.

10. The processor of claim 9, wherein the constant generator includes circuitry to output a successive two of a list of n constants each clock cycle.

11. The processor of claim 9, wherein the constant generator includes circuitry to store values of the n constants in m storage units, wherein m is less than n.

12. The processor of claim 5, wherein the data transformation circuit further includes circuitry to:
encode two elements of the data input per clock cycle; and
consume two round keys per clock cycle, each round key generated for a respective one of the two elements of the data input.

13. A processor, comprising:
a serial input circuit including circuitry to:
accept an element of a symmetric key and an element of a data input; and
store the element of the symmetric key into a higher-ordered round key storage register and store the element of the data input into a higher-ordered data storage register;
serially propagate elements of the higher-ordered round key storage register, a lower-ordered round key storage register, the higher-ordered data storage register, and a lower-ordered data storage register;
a Simon block cipher, including:
a data transformation circuit including circuitry to produce a transformed output, the transformed output based upon:
content of the end of the higher-ordered data storage register shifted three bits to the left, one bit to the left, and two bits to the left;
content of the end of the lower-ordered data storage register; and
content of the end of the lower-ordered round key storage register;
a constant generator; and
a key expansion circuit including circuitry to determine a round key value and store the round key value at the top of the higher-ordered round key storage register.

14. The processor of claim 13, wherein the key expansion circuit further includes circuitry to determine the round key value based upon content of the end of the higher-ordered key storage register shifted three bits to the right, content of the end of the lower-ordered key storage registers, and a value from the constant generator.

15. The processor of claim 13, wherein the data transformation circuit further includes circuitry to:
   determine whether the content of the end of the higher-ordered data storage, content of the end of the lower-ordered data storage register, or content of the end of the lower-ordered round key storage register include one or more unprocessed bits; and
   based on the determination, multiplex between one or more other storage positions that include respective unprocessed bits.

16. The processor of claim 13, wherein the constant generator includes circuitry to output a different, successive one of a list of n constants every m clock cycles, wherein m is the size of a data word of the Simon block cipher.

17. The processor of claim 13, further including a local clock, wherein:
   the higher-ordered round key storage register, higher-ordered round key storage register, lower-ordered round key storage register, and lower-ordered round key storage register are each implemented with storage latches coupled to the local clock; and
   the local clock includes circuitry to propagate a signal to elements of the higher-ordered round key storage register, higher-ordered round key storage register, lower-ordered round key storage register, and lower-ordered round key storage register in an order opposite to the serial propagation of elements.

* * * * *